(12) United States Patent
Otani et al.

(10) Patent No.: US 9,733,639 B2
(45) Date of Patent: Aug. 15, 2017

(54) DYNAMIC FACILITY MANAGEMENT SYSTEM

(75) Inventors: Tetsuo Otani, Komae (JP); Yuji Kimura, Tokyo (JP); Shigeki Katayama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 869 days.

(21) Appl. No.: 14/232,522

(22) PCT Filed: Jul. 13, 2012

(86) PCT No.: PCT/JP2012/004544
§ 371 (c)(1),
(2), (4) Date: Oct. 1, 2014

(87) PCT Pub. No.: WO2013/008476
PCT Pub. Date: Jan. 17, 2013

(65) Prior Publication Data
US 2015/0148917 A1   May 28, 2015

(30) Foreign Application Priority Data
Jul. 14, 2011   (JP) .................. 2011-155476

(51) Int. Cl.
G05B 11/01   (2006.01)
G05B 19/418   (2006.01)
(Continued)

(52) U.S. Cl.
CPC .......... *G05B 19/418* (2013.01); *G06Q 10/08* (2013.01); *G06Q 50/06* (2013.01); *H04L 67/10* (2013.01)

(58) Field of Classification Search
CPC ...... G05B 19/418; H04L 67/10; G06Q 10/08; G06Q 50/06
(Continued)

(56) References Cited

U.S. PATENT DOCUMENTS 5,650,936 A   7/1997   Loucks et al.
7,043,381 B2 *   5/2006   Wakida .............. H02J 13/001
340/870.02

(Continued)

FOREIGN PATENT DOCUMENTS

DE   102009012832 A1   9/2010
JP   2007188255 A   7/2007
JP   2010049560 A   3/2010

OTHER PUBLICATIONS

Masahiro Kurono, "'Johoka Kojo' eno FA Gijutsu no Yukuwari to Tekio-Hyojunka Gijutsu o Ikasu", Keiso, Jul. 1, 2010, pp. 36-41, vol. 53, No. 7.

*Primary Examiner* — Charles Kasenge
*Assistant Examiner* — Thomas Stevens
(74) *Attorney, Agent, or Firm* — The Webb Law Firm

(57) ABSTRACT

Disclosed is a dynamic facility management system that is able to start quickly and monitor a state when various measuring instruments are attached to or removed from the facility to be securely monitored and maintained. The system includes a sensor as a measuring instrument. A measuring instrument reading device, which is a lower level device, transmits a type of the measuring instrument and a purpose of connecting the measuring instrument to a directory server. The directory server generates an instance by referring to class information and generates and registers a relation instance by referring to an inter-class relationship. The directory server transmits the generated instance to related devices on the basis of an inter-instance relationship, and the directory server exchanges facility management data between instances on the basis of the inter-instance relationship.

4 Claims, 21 Drawing Sheets

(51) Int. Cl.
*G06Q 10/08* (2012.01)
*G06Q 50/06* (2012.01)
*H04L 29/08* (2006.01)

(58) Field of Classification Search
USPC .......................................................... 700/19
See application file for complete search history.

(56) References Cited

U.S. PATENT DOCUMENTS

| | | | | |
|---|---|---|---|---|
| 8,682,612 | B2 * | 3/2014 | Mousavi | G06Q 10/04 340/635 |
| 2011/0245936 | A1 | 10/2011 | Hermann et al. | |
| 2012/0004867 | A1 * | 1/2012 | Mousavi | G01R 31/3274 702/58 |
| 2012/0022713 | A1 * | 1/2012 | Deaver, Sr. | G05B 17/02 700/298 |
| 2012/0131217 | A1 * | 5/2012 | Delorme | G06Q 10/06 709/230 |
| 2014/0025321 | A1 * | 1/2014 | Spanier | G01R 21/133 702/62 |

* cited by examiner

DYNAMIC FACILITY MANAGEMENT SYSTEM

CROSS-REFERENCE TO RELATED APPLICATIONS

This application is the United States national phase of International Application No. PCT/JP2012/004544 filed Jul. 13, 2012, and claims priority to Japanese Patent Application No. 2011-155476 filed Jul. 14, 2011, the disclosures of which are hereby incorporated in their entirety by reference.

BACKGROUND OF THE INVENTION

Field of the Invention

The present invention relates to a dynamic facility management system. More specifically, the present invention relates to a technique that is suitably applied to a system that recognizes a state to monitor, secure, and maintain a target facility and collects and uses information used for facility management.

Description of Related Art

Regarding electric power distribution facilities such as transformers and switches, a ratio of highly aged facilities that have been used more than 30 years since the start of operation increases. Further, there is a limitation of the number of maintenance works that can be performed in one year, so that it is impossible to collectively update a large number of facilities around the same time. Therefore, it is becoming a challenge to stably maintain a highly aged facility and efficiently operate the highly aged facility from a viewpoint of economy. To overcome such a challenge, the introduction of methods such as condition based maintenance (CBM: abbreviation of Condition Based Maintenance) and reliability centered maintenance (RCM: abbreviation of Reliability Centered Maintenance) is advanced. To implement these methods, it is necessary to recognize a state of an operating electric power distribution facility. Therefore, a system that collects and uses various information used for facility maintenance plays an important role. In the present invention, such a system is referred to as a facility maintenance system. The various information used for facility maintenance is referred to as maintenance information or facility maintenance data.

In the facility maintenance system, it is required to be able to quickly and easily construct a mechanism to collect and use information used for facility maintenance when the condition based maintenance or the like is required. This is based on the fact that the lives of sensors and information communication devices included in the facility maintenance system are as short as about 10 years or less and the cost does not pay off if the sensors and the information communication devices are permanently installed in a period of time in which failure hardly occurs in the facility to be monitored and maintained, so that it is expected to increase the cost-effectiveness if states are collected by a minimum number of sensors during normal time and sensors are added in a stage in which a failure sign is detected or in a stage changing from a random failure stage to a degradation failure stage in a bathtub curve.

Therefore, it is desirable that software that collects, manages, and processes the facility maintenance data is automatically set in the facility maintenance system and the state monitoring can be quickly and easily started when sensors are attached to or removed from the facility to be monitored and maintained. Such an automatic setting function is referred to as plug-and-play and is also written as PnP in the present invention. The inventors have studied a facility maintenance system based on an information model to realize such PnP. The information model is to process and exchange maintenance information and corresponds to a blueprint of an object which is a type of a software module. A module called an object can be used, so that it is possible to clarify units of combination in the PnP.

In a facility management system including the aforementioned facility maintenance system which monitors, secures, and maintains a target facility, it is necessary to associate a plurality of objects with each other and further it is necessary for the objects associated with each other to collect, manage, and process various information used for facility management, such as maintenance information and facility maintenance data through a communication network. In the present invention, such a system in which a plurality of objects are associated with each other and the objects associated with each other collect, manage, and process data and the like while autonomously coping with a situation is referred to as a dynamic facility management system. The various information used for facility management is referred to as facility management data.

As a conventional technique related to connecting to a communication network, there is Universal Plug and Play (Patent Literature 1). The Universal Plug and Play is written as UPnP.

CITATION LIST

Patent Literature

Patent Literature 1: JP 2007-188255 A

However, in the UPnP, while it is possible to acquire an IP address of a device connected to the communication network, detect the device, and provide information of functions provided by the device, there is a problem that the UPnP does not cover how to organize and provide procedures related to collection and processing of the facility management data and information related between the objects. Therefore, it is hard to say that it is possible to quickly and easily construct a mechanism to collect and use information used for facility management when the condition based maintenance or the like is required in the facility management system as intended by the present invention, in other words, it is hard to say that related software is automatically set in the facility management system and the state monitoring can be quickly and easily started when various measuring instruments are attached to or removed from a facility to be managed, which is monitored, secured, and maintained.

SUMMARY OF THE INVENTION

Therefore, an object of the present invention is to provide a plug-and-play type dynamic facility management system where related software is automatically set in the facility management system and the state monitoring can be quickly and easily started when various measuring instruments are attached to or removed from a target facility handled by the system, such as a facility to be monitored, secured, and maintained.

In order to achieve the object, a dynamic facility management system of the present invention includes: a measuring-instrument reading device that performs input/output of signals from/to a measuring instrument that acquires information of a target facility handled by the system; a first device that performs input/output of signals from/to the measuring-instrument reading device; and a second device that has a set of software and performs input/output of signals from/to the first device, wherein when the measuring instrument is connected to the measuring-instrument reading device, the second device determines software required by the system on the basis of information of the measuring instrument and the second device transmits the software to the first device and the measuring-instrument reading device.

Therefore, according to this dynamic facility management system, the second device autonomously determines the software required by the system and transmits the software to related devices, so that related software is automatically set in the system and the state monitoring is quickly and easily started when various measuring instruments are attached to or removed from the target facility handled by the system, that is, the facility to be managed.

Further, a dynamic facility management system of the present invention includes: a measuring instrument that acquires information of a target facility handled by the system; a lower level device that performs input/output of signals from/to the measuring instrument directly or through a communication network; a higher level device that performs input/output of signals from/to the lower level device directly or through a communication network; and a server that performs input/output of signals from/to the lower level device and the higher level device, wherein the dynamic facility management system stores class information for each class including an item of information of the target facility handled by the system acquired by the measuring instrument (hereinafter referred to as a class name) and a name of an instance generated corresponding to the class name, instance information for each instance including a name of the instance, an arranged location of the instance, and the class name, an inter-class relationship including a class name corresponding to higher level facility management data, a class name corresponding to lower level facility management data used to generate the higher level facility management data, how to use the lower level facility management data used to generate the higher level facility management data, and a name of a relation instance generated corresponding to a combination of a class corresponding to the higher level facility management data and a class corresponding to the lower level facility management data, and an inter-instance relationship for each relation instance including a name of the instance arranged in the higher level device and a name of the instance arranged in the lower level device in the server, when the measuring instrument is connected to the lower level device or the communication network that performs input/output of signals from/to the lower level device, the lower level device transmits a type of the measuring instrument and a purpose of connecting the measuring instrument which is an item of information of the target facility handled by the system to the server, the server generates an instance by referring to the class information on the basis of the type of the measuring instrument and the purpose of connecting the measuring instrument which is an item of information of the target facility handled by the system, the server searches the instance information and if the generated instance is not present, the server registers the generated instance and generates and registers a relation instance by referring to the inter-class relationship, the server transmits the generated instance to the lower level device and the higher level device on the basis of the inter-instance relationship, and the server exchanges the facility management data between the instances on the basis of the inter-instance relationship.

Further, in the dynamic facility management system of the present invention, when the measuring instrument is removed from the lower level device or the communication network that performs input/output of signals from/to the lower level device, the lower level device transmits a name of the generated instance corresponding to the removed measuring instrument to the server, the server updates the instance information so as to change a state of a predetermined instance to a state in which the facility management data is not processed and instructs the lower level device to delete an instance corresponding to the removed measuring instrument, the lower level device deletes the instance corresponding to the removed measuring instrument, and the higher level device and the server change a state of the instance corresponding to the removed measuring instrument to a state in which the facility management data is not processed on the basis of the instance information.

Therefore, according to the dynamic facility management system, the server generates an instance based on the type of the measuring instrument and the like and transmits the instance to related devices and further the server generates a relation instance related to the instance, registers the instance in the server, and exchanges the facility management data between the instances, so that related software is automatically set in the system and the state monitoring is quickly and easily started when various measuring instruments are attached to or removed from the target facility handled by the system, that is, the facility to be managed.

In the dynamic facility management system of the present invention, when the target facility handled by the system is a circuit breaker in a transformer substation and the measuring device is a sensor that acquires a current passing through the circuit breaker and a palette switch operation signal as information, the dynamic facility management system can be functioned as a facility maintenance system of an electric power distribution facility.

Further, in the dynamic facility management system of the present invention, all data of the relation instance are character strings. In this case, it is possible to call a method based on information of the inter-instance relationship by using the reflection.

According to the dynamic facility management system of the present invention, related software is automatically set in the system and the state monitoring can be quickly and easily started when various measuring instruments are attached to or removed from the target facility handled by the system, that is, the facility to be managed, so that it is possible to improve efficiency of works related to collection and use of information used for facility management.

Further, when the dynamic facility management system of the present invention is functioned as a facility maintenance system of an electric power distribution facility, it is possible to improve efficiency of works related to collection and use of information used to maintain the electric power distribution facility.

DESCRIPTION OF THE INVENTION

Figure 1:
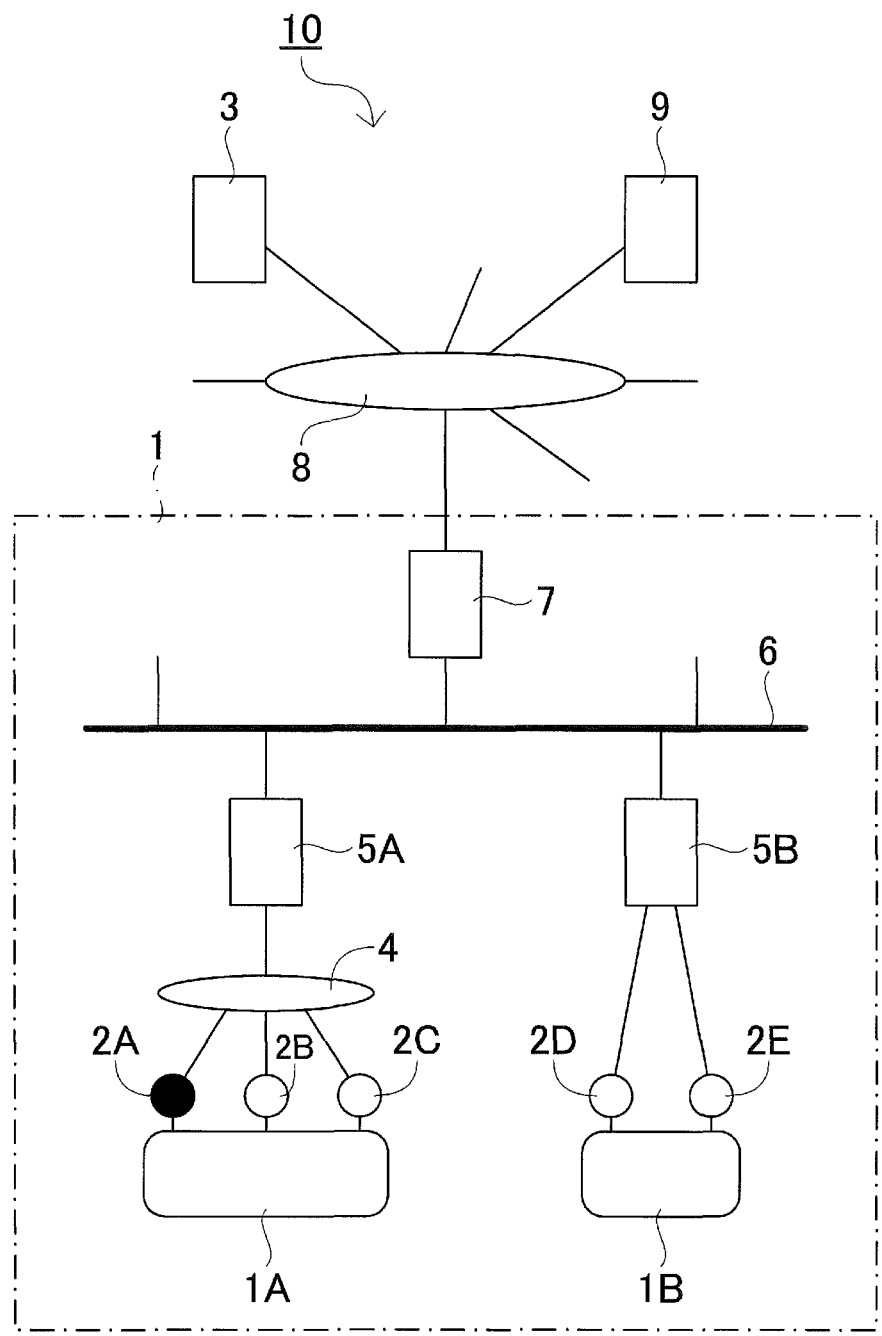
FIG. 1 is a device configuration diagram illustrating an outline of an embodiment of a dynamic facility management system of the present invention.

Hereinafter, a configuration of the present invention will be described in detail on the basis of an example of an embodiment illustrated in the drawings.

A dynamic facility management system of the present invention includes a measuring-instrument reading device that performs input/output of signals from/to a measuring instrument that acquires information of a target facility handled by the system, a first device that performs input/output of signals from/to the measuring-instrument reading device, and a second device that has a set of software and performs input/output of signals from/to the first device. When the measuring instrument is connected to the measuring-instrument reading device, the second device determines software required by the system on the basis of information of the measuring instrument and the second device transmits the software to the first device and the measuring-instrument reading device.

In FIGS. 1 to 21, an electric power distribution facility is taken up as a target facility handled by a system that performs monitoring, securing, and maintenance, that is to say, as a facility to be managed, and an example of an embodiment in which the dynamic facility management system of the present invention is applied to a facility maintenance system of the electric power distribution facility will be described. Specifically, in the present embodiment, a case will be described as an example in which when a measuring instrument, which is various sensors or the like that acquire facility maintenance data of a transformer substation facility which is an electric power distribution facility to which the present invention is applied, is added, plug-and-play that automatically performs setting of the facility maintenance system is performed. Specifically, as illustrated in FIG. 1, a case will be described as an example in which sensors 2B and 2C are attached to a circuit breaker 1A in a transformer substation 1 and sensors 2D and 2E are attached to a gas insulated switchgear 1B and further a sensor 2A which is a measuring instrument is newly attached to the circuit breaker 1A which is a facility to be managed. In the description below, the measuring instrument which represents various sensors or the like may be simply referred to as a sensor.

Measurement data of the sensors 2A, 2B, and 2C that are attached to or to be attached to the circuit breaker 1A is inputted to a measuring-instrument reading device 5A through a measuring instrument network 4 and measurement data of the sensors 2D and 2E that are attached to the gas insulated switchgear 1B is directly inputted to a measuring-instrument reading device 5B. Here, the measuring instrument network 4 is not an essential configuration in the present invention. The measuring instrument network 4 is called a sensor network and can specifically be formed by using, for example, ZigBee. In the description below, when the sensors 2A, 2B, 2C, 2D, and 2E need not be distinguished from each other or all the sensors are indicated, the sensors 2A, 2B, 2C, 2D, and 2E are simply referred to as a sensor 2 or sensors 2. When comparing with the configuration of the present invention, the facility maintenance data and the measurement data correspond to the information of the target facility handled by the system. A type of the measuring instrument and a monitoring item/a measuring item which are a purpose of connecting the measuring instrument correspond to the information of the measuring instrument.

As the measuring-instrument reading devices 5A and 5B, a device that receives an electrical signal transmitted from the sensor 2 through a cable and a device that receives a wireless signal communicated by wireless communication are used. Specifically, this mechanism is described in, for example, TSUCHIYA Takehiko, SHONO Takaya, SEKIGU-CHI Katsuhiko, "Future of Power System Monitoring Systems Using Network Computing Terminals", TOSHIBA REVIEW Vol. 61, No. 11, pp. 44-47, 2006. The signal transmitted from the sensor 2 is assumed to be an analog signal or a digital signal.

In the present invention, what type of measuring instrument is used as the sensor 2 which is the measuring instrument and how to install the measuring instrument, what type of signal reading device is used as the measuring-instrument reading devices 5A and 5B, and how to connect the sensor 2 which is the measuring instrument and the measuring-instrument reading devices 5A and 5B are not limited to specific types and methods, but are appropriately selected on the basis of the target facility handled by the system, that is, the type of the facility to be managed, content of the facility management, and the like.

The measuring-instrument reading devices 5A and 5B receive the signal transmitted from the sensor 2 by converting the signal into a data format handled by the facility maintenance system. The measuring-instrument reading devices 5A and 5B perform input/output of signals such as a data signal and an instruction signal from/to a data management device 7 through an in-house LAN 6 in the transformer substation 1. It is not essential to arrange a communication network such as LAN between the measuring-instrument reading devices 5A and 5B and the data management device 7, and the measuring-instrument reading devices and the data management device 7 may be directly connected. When comparing with the configuration of the present invention, the data management device 7 is the first device.

The data signal transmitted from the sensor 2 is collected to the data management device 7 through the measuring-instrument reading devices 5A and 5B. The data management device 7 organizes and saves the data transmitted from the measuring-instrument reading devices 5A and 5B in chronological order as needed and calculates new data by combining a plurality of data. Specifically, for example, a personal computer is used as the data management device 7.

The data which is collected to the data management device and processed as needed is transmitted to a facility maintenance application server 9 through a communication network 8 such as an in-house network and the Internet. The facility maintenance application server 9 provides a function corresponding to a maintenance task element such as, for example, failure analysis and facility state determination. Specifically, for example, a PC is used as the facility maintenance application server 9. What function and data are provided by the facility maintenance application server 9 is not an object of the present invention, and further, an installation of the facility maintenance application server 9 is not an essential element of the present invention and another system that performs work management may be connected.

(1) Outline of Facility Management System

Figure 2:
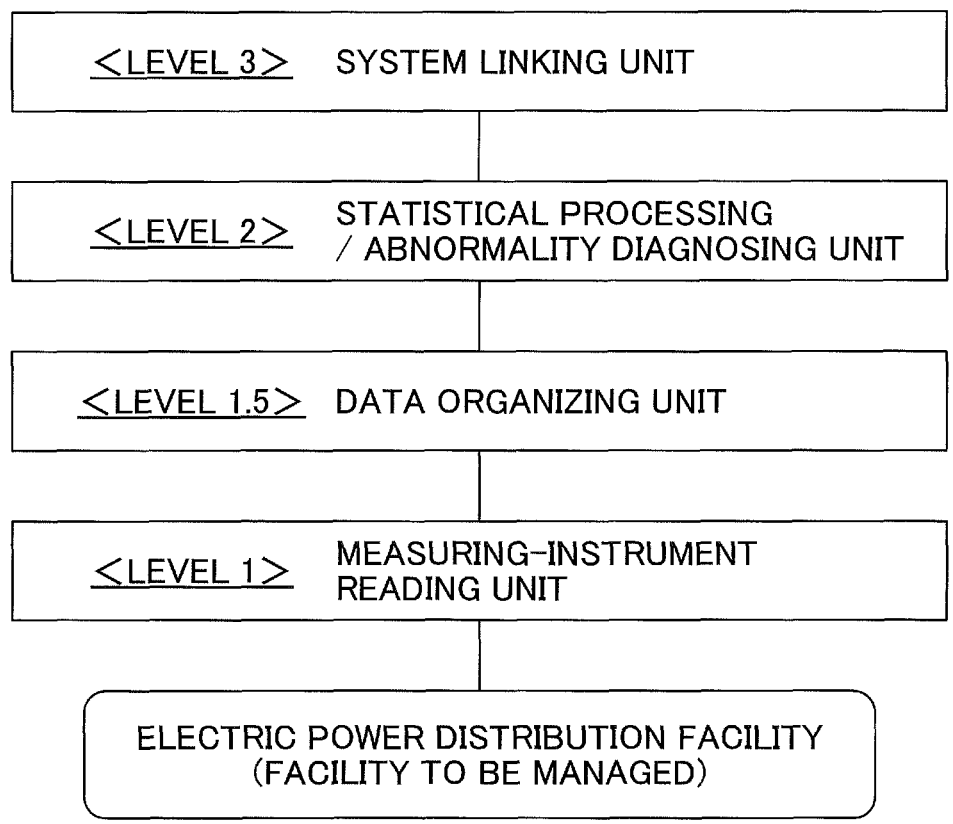
FIG. 2 is a diagram illustrating a system architecture of the dynamic facility management system of the present invention.

In the present invention, as a whole, as illustrated in FIG. 2, a system architecture of four layers (levels) is assumed. Outlines of each level are as follows:

<Level 1> Measuring-Instrument Reading Unit

The measuring-instrument reading unit reads a signal transmitted from a connected measuring instrument, converts the signal to be able to be used as digital data, and takes the digital data into an object. In the case of the example illustrated in FIG. 1, the measuring-instrument reading unit reads a signal transmitted from the sensor 2 and converts the signal. The measuring-instrument reading devices 5A and 5B correspond to the measuring-instrument reading unit.

<Level 1.5> Data Organizing Unit

The data organizing unit manages chronological data for each monitoring item or measuring item and calculates data of a new monitoring item obtained from measurement data of a plurality of monitoring items for the data from the measuring-instrument reading unit. In the case of the example illustrated in FIG. 1, the data organizing unit manages chronological data for each monitoring item such as, for example, a current value of the measuring-instrument reading devices 5A and 5B and calculates data of a new monitoring item obtained from measurement data of a plurality of monitoring items. The data management device 7 corresponds to the data organizing unit.

<Level 2> Statistical Processing/Abnormality Diagnosing Unit

The statistical processing/abnormality diagnosing unit manages, for example, maximum/minimum values and trend of data accumulated in the data organizing unit and extracts a case in which an occurrence of abnormality such as an exceedance of a threshold value and a change of trend is suspected. In the case of the example illustrated in FIG. 1, the facility maintenance application server 9 corresponds to the statistical processing/abnormality diagnosing unit. However, as described above, the installation of the facility maintenance application server 9 is not an essential element of the present invention.

<Level 3> System Linking Unit

The system linking unit performs necessary data exchange with another system. In the case of the example illustrated in FIG. 1, the system linking unit performs necessary data exchange with a system other than the dynamic facility management system of the present invention, for example, a work management system. The facility maintenance application server 9 corresponds to the system linking unit. However, as described above, the installation of the facility maintenance application server 9 is not an essential element of the present invention.

(2) Outline of Plug-and-Play of the Present Invention

The present embodiment deals with plug-and-play where setting of a facility management system or a facility maintenance system is automatically performed when a measuring instrument that acquires facility management data is added. When a measuring instrument is attached, the works and the addition of functions as described below are performed in the facility management system or the facility maintenance system. The facility management data is also referred to as facility maintenance data in the facility maintenance system of the present embodiment.

i) A measuring instrument is attached to the facility to be managed, which is an object to be measured.

In the present embodiment, the facility to be managed is the circuit breaker 1A and the measuring instrument is the sensor 2A.

ii) A communication path between the sensor 2A and the measuring-instrument reading device 5A is arranged and set.

iii) An object for taking a signal from the sensor 2A into an appropriate data format is generated on the basis of the type of the sensor 2A which is the measuring instrument and recognition of the circuit breaker 1A which is the object to be measured and the object is arranged in the measuring-instrument reading device 5A.

iv) A data format necessary for each maintenance task is prepared based on the data obtained from the sensor 2A and an object having a related information processing function is added or changed in the data management device 7 and the facility maintenance application server 9.

Here, in the plug-and-play of the present invention, if the sensor 2A which is the measuring instrument is attached to the circuit breaker 1A which is the object to be measured and the sensor 2A is physically connected to the measuring-instrument reading device 5A, which is a component that reads the measuring instrument, by using wired or wireless communication, the remaining settings are automatically and reliably performed by the facility management system. In summary, if the aforementioned i) and ii) are manually performed, the aforementioned iii) and iv) are automatically performed.

The addition of the sensor 2, which is the measuring instrument, as described above is classified into the three types described below according to whether or not the measuring instrument and related data have already been used.

1) The measuring instrument to be attached and the use method thereof have already been used in the past. In other words, a known measuring instrument is added.

2) While the measuring instrument to be attached has already been used in the past, the use method is new. In other words, new data is added.

3) The measuring instrument to be attached and the use method thereof have not been used in the past. In other words, a new measuring instrument is added.

On the other hand, when a measuring instrument is removed, i) detection of removal of the sensor, ii) deletion of an object corresponding to the sensor, and iii) stop of an object mounted in the data management device 7 are automatically performed.

The dynamic facility management system of the present embodiment includes the sensor 2A which is the measuring instrument that acquires information of the circuit breaker 1A which is the target facility handled by the system, the measuring-instrument reading device 5A which is a lower level device that performs input/output of signals from/to the sensor 2A, which is the measuring instrument, directly or through a communication network 4, the data management device 7 which is a higher level device that performs input/output of signals from/to the measuring-instrument reading device 5A, which is the lower level device, directly or through a communication network 6, and a directory server 3 that performs input/output of signals from/to the measuring-instrument reading device 5A which is the lower level device and the data management device 7 which is the higher level device, stores class information for each class including an item of information of the target facility handled by the system acquired by the measuring instrument (hereinafter referred to as a class name) and a name of an instance generated corresponding to the class name, instance information for each instance including a name of the instance, an arranged location of the instance, and the class name, an inter-class relationship including a class name corresponding to higher level facility management data, a class name corresponding to lower level facility management data used to generate the higher level facility management data, how to use the lower level facility management data used to generate the higher level facility management data, and a name of a relation instance generated corresponding to a combination of a class corresponding to the higher level facility management data and a class corresponding to the lower level facility management data, and an inter-instance relationship for each relation instance including a name of an instance arranged in the higher level device and a name of an instance arranged in the lower level device in the directory server 3. The measuring-instrument reading device 5A which is the lower level device detects that the sensor 2A which is the measuring instrument is connected when the sensor 2A which is the measuring instrument is connected to the lower level device or the communication network 4 that performs input/output of signals from/to the lower level device <Function 1>, the measuring-instrument reading device 5A which is the lower level device transmits a type of the measuring instrument and a purpose of connecting the measuring instrument which is an item of information of the target facility handled by the system to the directory server 3 <Function 2>, the directory server 3 generates an instance by referring to the class information on the basis of the type of the measuring instrument and the purpose of connecting the measuring instrument which is an item of information of the target facility handled by the system <Function 3>, the directory server 3 searches the instance information and if the generated instance is not present, the directory server 3 registers the generated instance and generates and registers a relation instance by referring to the inter-class relationship <Function 4>, the directory server 3 transmits the generated instance to the lower level device and the higher level device on the basis of the inter-instance relationship <Function 5, Function 6>, and the directory server 3 exchanges the facility management data between instances on the basis of the inter-instance relationship <Function 7, Function 8, Function 9>.

Figure 3:
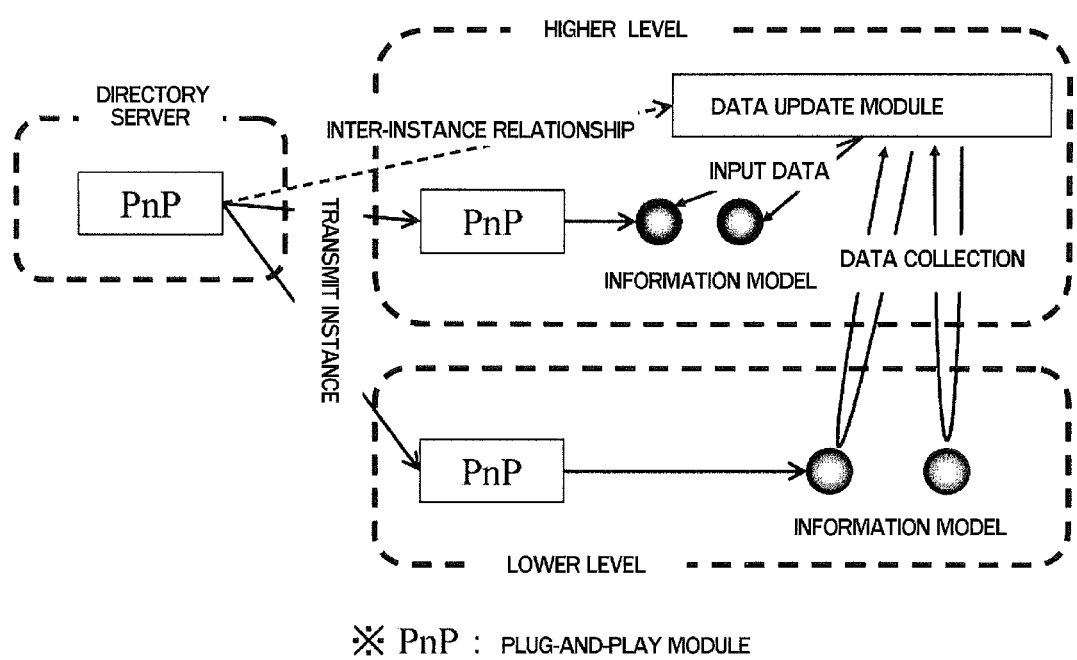
FIG. 3 is a diagram illustrating a basic configuration of the dynamic facility management system of the present invention.

(3) Outline of a Method of Implementing the Plug-and-Play of the Present Invention FIG. 3 illustrates a basic configuration of the dynamic facility management system including the plug-and-play function of the present invention. The higher level and the lower level in FIG. 3 correspond to higher and lower levels in the four-layer system architecture illustrated in FIG. 2. Specifically, for example, the higher level is the Level 1.5 and the lower level is the Level 1.

Elements that forms a system that implements the plug-and-play of the present invention is as follows:

i) Plug-and-Play Module

The plug-and-play module arranges an instance of an information model in the dynamic facility management system and enables management and processing of the facility management data. The plug-and-play module is written as PnP in FIG. 3.

ii) Directory Server

The directory server manages data necessary to implement the plug-and-play.

iii) Information Model

The information model manages and processes the facility management data.

iv) Data Update Module

The data update module collects the facility management data from a lower level information model and inputs the facility management data into an appropriate information model.

Figure 4:
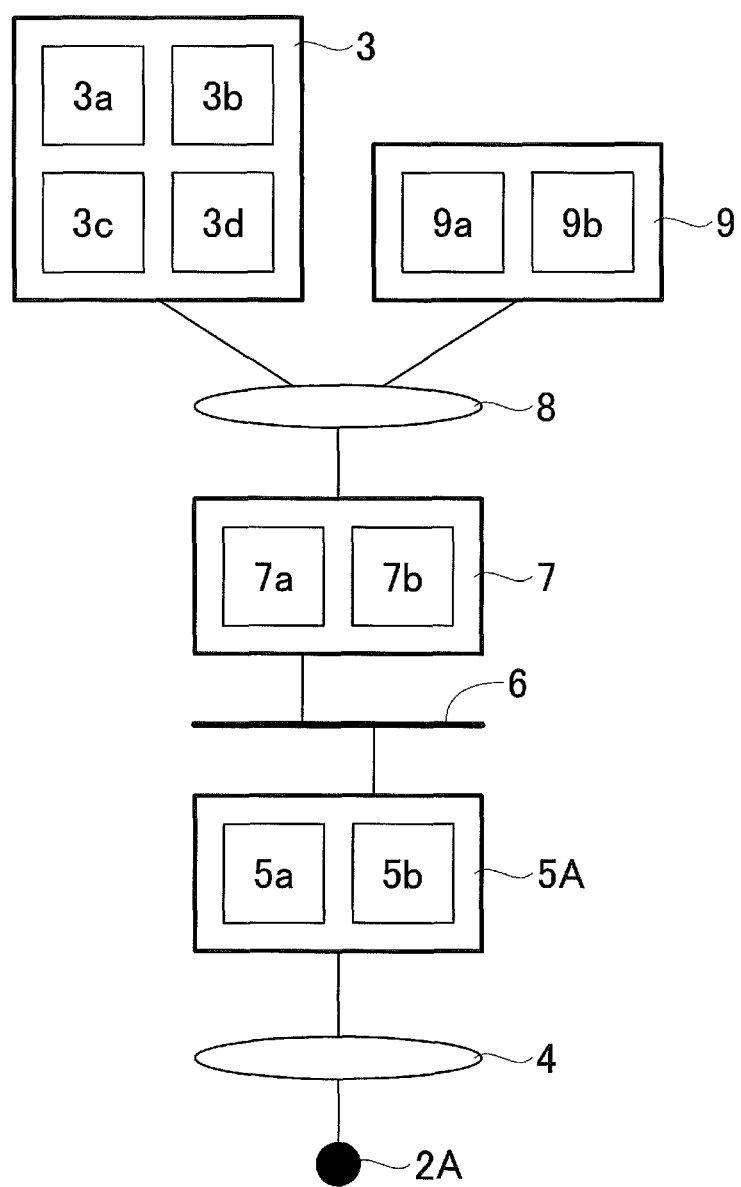
FIG. 4 is a functional block diagram illustrating an outline of a facility management system/a facility maintenance system of the embodiment.

Here, the description below explains an implementation of the plug-and-play in a case in which the sensor 2A which is the measuring instrument is connected by a device/function configuration illustrated in FIG. 4 corresponding to the device configuration illustrated in FIG. 1. Specifically, an information terminal is provided as the measuring-instrument reading device 5A, a transformer substation server is provided as the data management device 7, and a maintenance server is provided as the facility maintenance application server 9. Further, the directory server 3 is connected to the communication network 8 and a data signal and an instruction signal are transmitted and received through the communication network 8. Specifically, for example, a PC is used as the directory server 3. When comparing with the configuration of the present invention, as described above, the data management device 7 is the first device and the directory server 3 is the second device. Specifically, for example, NCT (abbreviation of Network Computing Terminal) made by Toshiba Corporation which directly takes in a sensor signal can be used as the information terminal.

(4) Plug-and-Play Module (4-1) Functional Specification of Plug-and-Play System

The plug-and-play module does not implement a required function by its own, but implements PnP of a software module based on an information model by cooperation of a plurality of plug-and-play modules or cooperation with a directory service.

The information model is a specification of a software module obtained by summarizing an electric power distribution facility and matters related to the electric power distribution facility on the basis of object-orientation. In the International Electrotechnical Committee (IEC: abbreviation of International Electrotechnical Committee), there are an information model of IEC 61850 (see IEC, "Communication network and systems for power utility automation—Part 7-4: Basic communication structure—Compatible logical node classes and data classes", IEC 61850-7-4 Ed.2 2009) which is considered to be mainly used in a transformer substation monitoring control system, a common information model (see IEC, "Energy management system application program interface (EMS-API)—Part 301: Common information model (CIM) base", IEC 61970-301 Ed.2 2009) which is intended for an API (abbreviation of Application Program Interface) in a system of a load-dispatching office, and further IEC 61968 (see IEC, "System interfaces for distribution management—Part 11: Distribution information exchange model", IEC 61968-11 INF, 2004) where a common information model is applied to various tasks of power distribution management. A main purpose of use of the information model in the IEC is to secure interoperability. On the other hand, in the present invention, the information model is used to secure functionality and maintainability by effectively utilizing the features of object-oriented technique. Here, the functionality means "capability of a software product to provide a function that explicitly or implicitly corresponds to necessity when the software is widely used under a specified condition", and the maintainability means "capability of a software product related to ease of modification, here, the modification may include correction, improvement, and adaptation of software to change of environment, change of required specification, and change of functional specifications" (see JIS X 0129). Based on these, in the dynamic facility management system of the present invention, an object of an information model provides a method and an application uses the object of the information model by calling the method. At this time, the application uses the object without being conscious of whether the object is located in the same device as that of the application or in a remote device. The details of the information model of the present invention will be described later in (6).

In the present embodiment, the behavior of the entire plug-and-play function of the present invention will be chronologically described by using an example in which the sensor 2A is connected to the measuring-instrument reading device 5A and an example in which the sensor 2A is removed from the measuring-instrument reading device 5A.

More specifically, in the present embodiment, a case will be described as an example in which the circuit breaker in a transformer substation 1 is defined as the target facility handled by the system, that is to say, the facility to be managed, a current passing through the circuit breaker and a palette switch operation signal are monitored, and a breaking current and the number of operation times of the palette switch are managed.

i) Behavior when Sensor is Connected

First, behavior when the sensor 2A is connected to the measuring-instrument reading device 5A will be described below. In the plug-and-play in the dynamic facility management system of the present invention, when a sensor is attached, an object of an information model is automatically generated and arranged from the type/specification of the sensor, information of the object to be measured, that is, the position where the sensor is installed, the purpose of attaching the sensor, and the like.

—Step 1—

Figure 5:
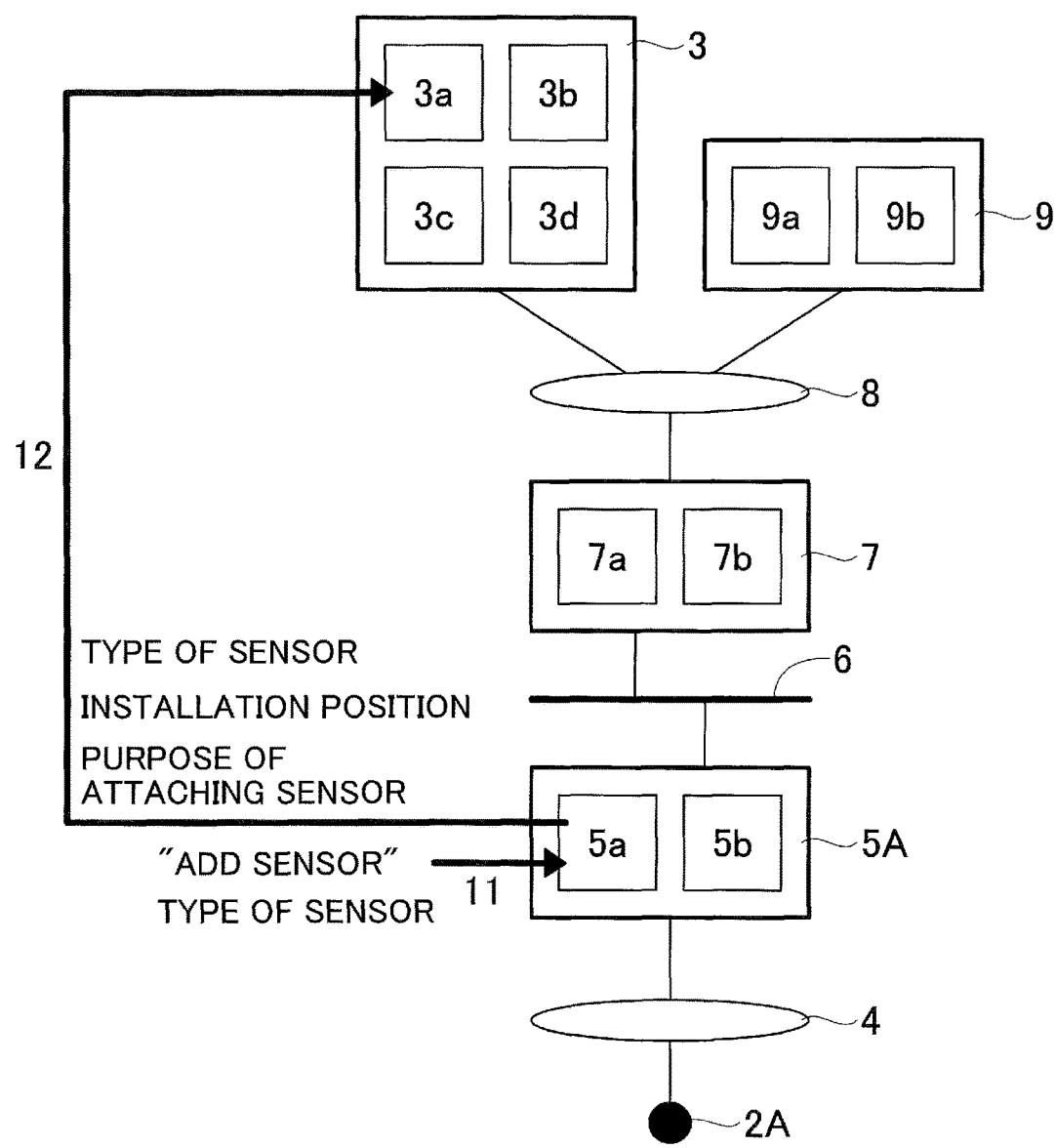
FIG. 5 is a functional block diagram for explaining an operation of the facility management system/the facility maintenance system of the embodiment and is a diagram for explaining an operation when a sensor is connected—No. 1—.

As illustrated in FIG. 5, the sensor 2A is connected to the measuring-instrument reading device 5A through the measuring instrument network 4. In FIG. 5, the measuring-instrument reading device 5A corresponds to the "lower level" device in FIG. 3, the transformer substation server 7 corresponds to the "higher level" device, and the directory server 3 corresponds to the "directory server".

The attaching of the sensor 2A is detected by a plug-and-play module 5a of the measuring-instrument reading device 5A. At this time, type information of the sensor 2A is given by an operator as an input to the plug-and-play module 5a. This process is represented by reference numeral 11 in FIG. 5.

—Step 2—

The plug-and-play module 5a of the measuring-instrument reading device 5A notifies a plug-and-play module 3a of the directory server 3 that the sensor 2A is attached and also notifies the plug-and-play module 3a of the type of the attached sensor 2A, the purpose of attaching the sensor, and the installation position of the sensor. This process is represented by reference numeral 12 in FIG. 5. Here, the purpose of attaching the sensor is recognized by referring to an inter-class relationship. In the present embodiment, the type of the sensor 2A is a palette switch, the purpose of attaching is the accumulated number of operation times of the circuit breaker, and the installation position is the circuit breaker in the transformer substation 1. In the description of the present embodiment, the circuit breaker is also referred to as "CB" or "CB1".

—Step 3—

Figure 6:
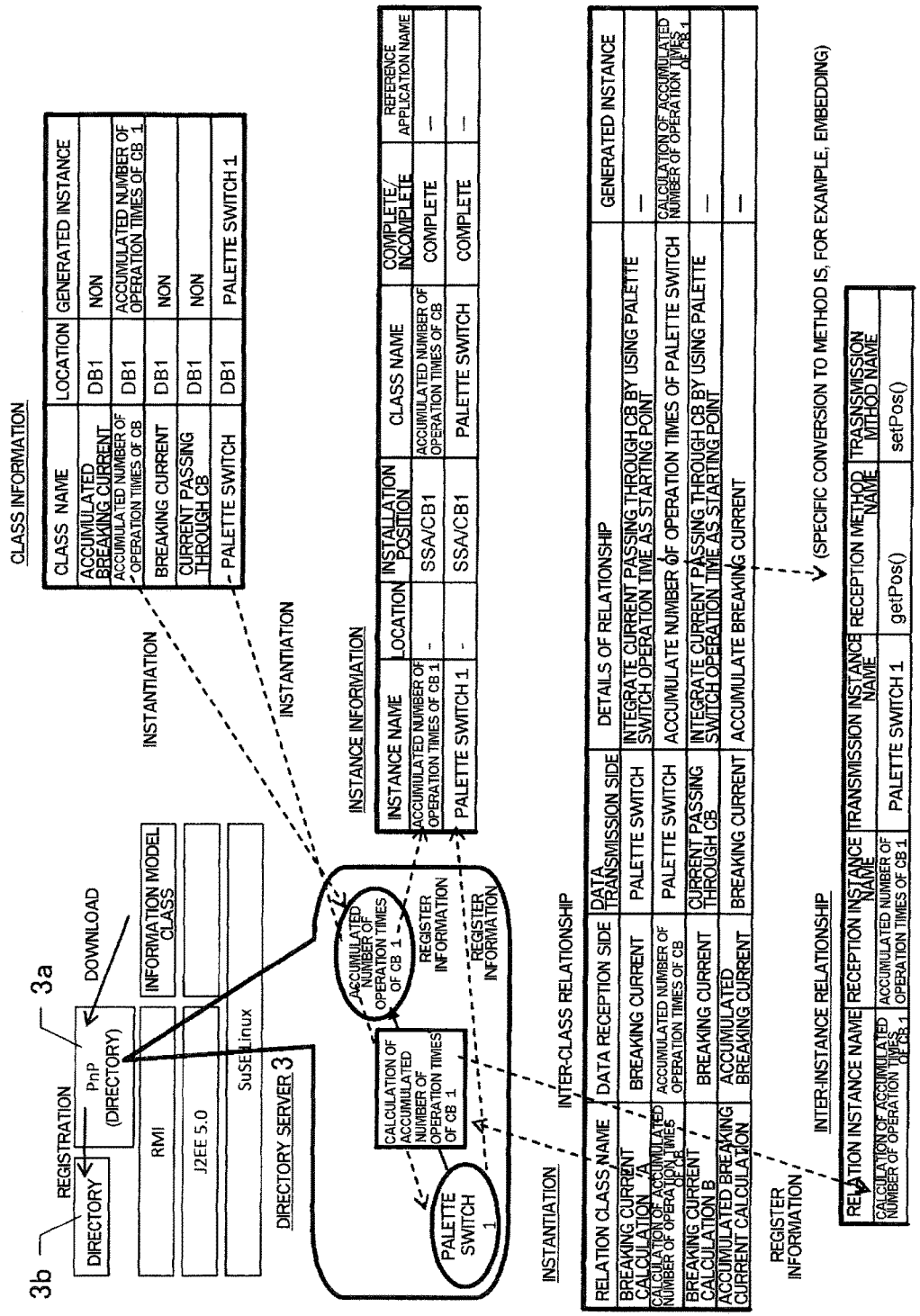
FIG. 6 is a functional block diagram for explaining an operation of the facility management system/the facility maintenance system of the embodiment and is a diagram for explaining an operation when a sensor is connected—No. 2—.
Figure 7:
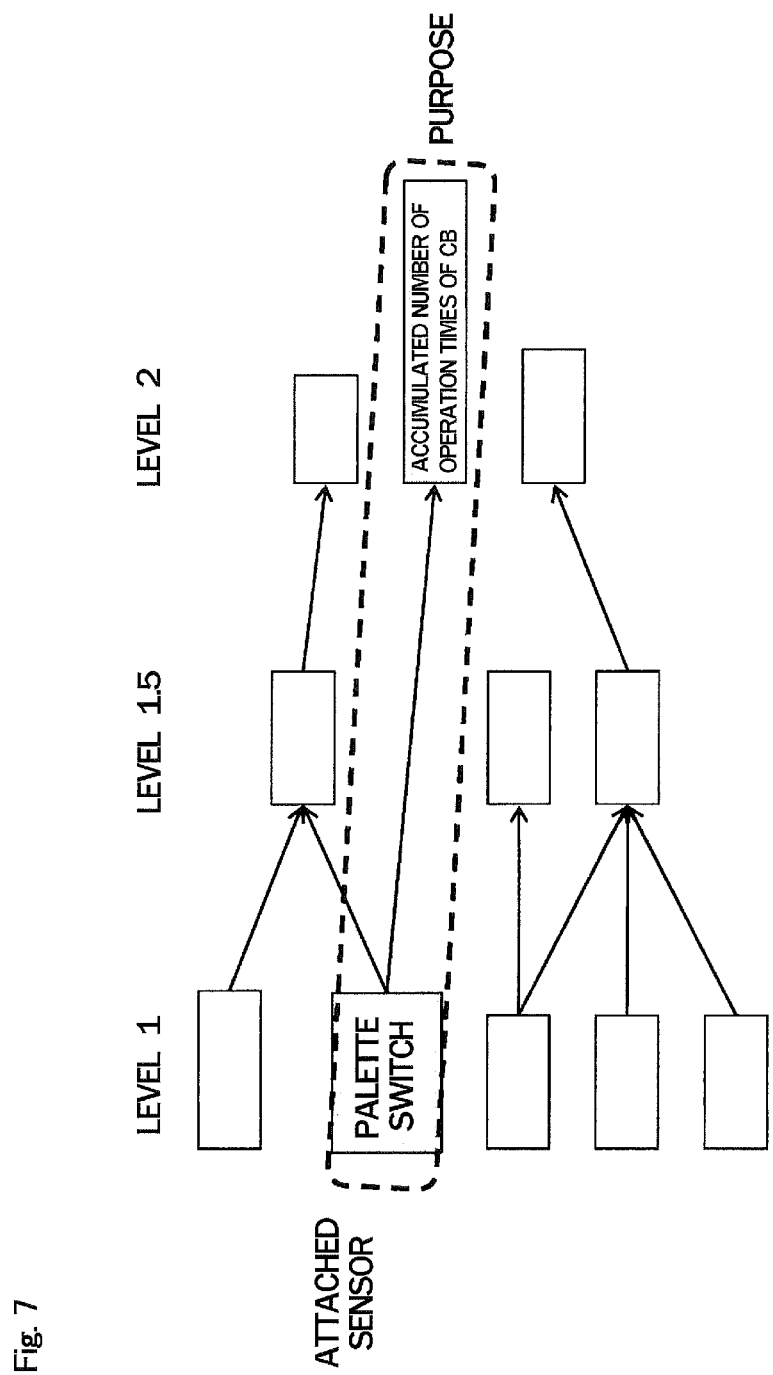
FIG. 7 is a diagram for explaining an object for each level and a data flow thereof.

The plug-and-play module 3a of the directory server 3 searches a directory 3b in the directory server 3 on the basis of the given information and takes out a necessary class file as well as generates an instance, in other words, performs instantiation, from the class, that is, an information model class. Content of this processing is illustrated in FIG. 6. In FIG. 6, the "generated instance" in the "class information" represents the name of the generated instance. When comparing with the configuration of the present invention, the "class name" in the "class information" corresponds to an item of information of the target facility handled by the system, that is, the facility to be managed, and also corresponds to the monitoring item/the measuring item as a purpose of installation which is the purpose of connecting the sensor described later. In FIG. 6, a solid line ellipse represents an instance in a "complete state", that is, a state in which processing of the facility management data is performed, and a dashed line arrow represents a flow of the facility management data.

In this case, not only the instance corresponding to the attached sensor 2A, but also instances of all classes included in a sub-tree whose root is a purpose given in a level tree are generated. The sub-tree is a dashed line portion in FIG. 7. In the example illustrated in FIG. 6, the instance "palette switch 1" corresponding to <Level 1> and the instance "accumulated number of operation times of CB 1" corresponding to <Level 2> are generated. Then, the plug-and-play module 3a registers information of the generated instances in the directory 3b in the directory server 3. In the "installation position", that is, the installation position of the measuring instrument, in the "instance information" in FIG. 6, the transformer substation 1 is represented as "SSA" and the circuit breaker is represented as "CB1". In the "location" in the "class information" in FIG. 6, the directory server 3 is represented as "DB1".

—Step 4—

Figure 8:
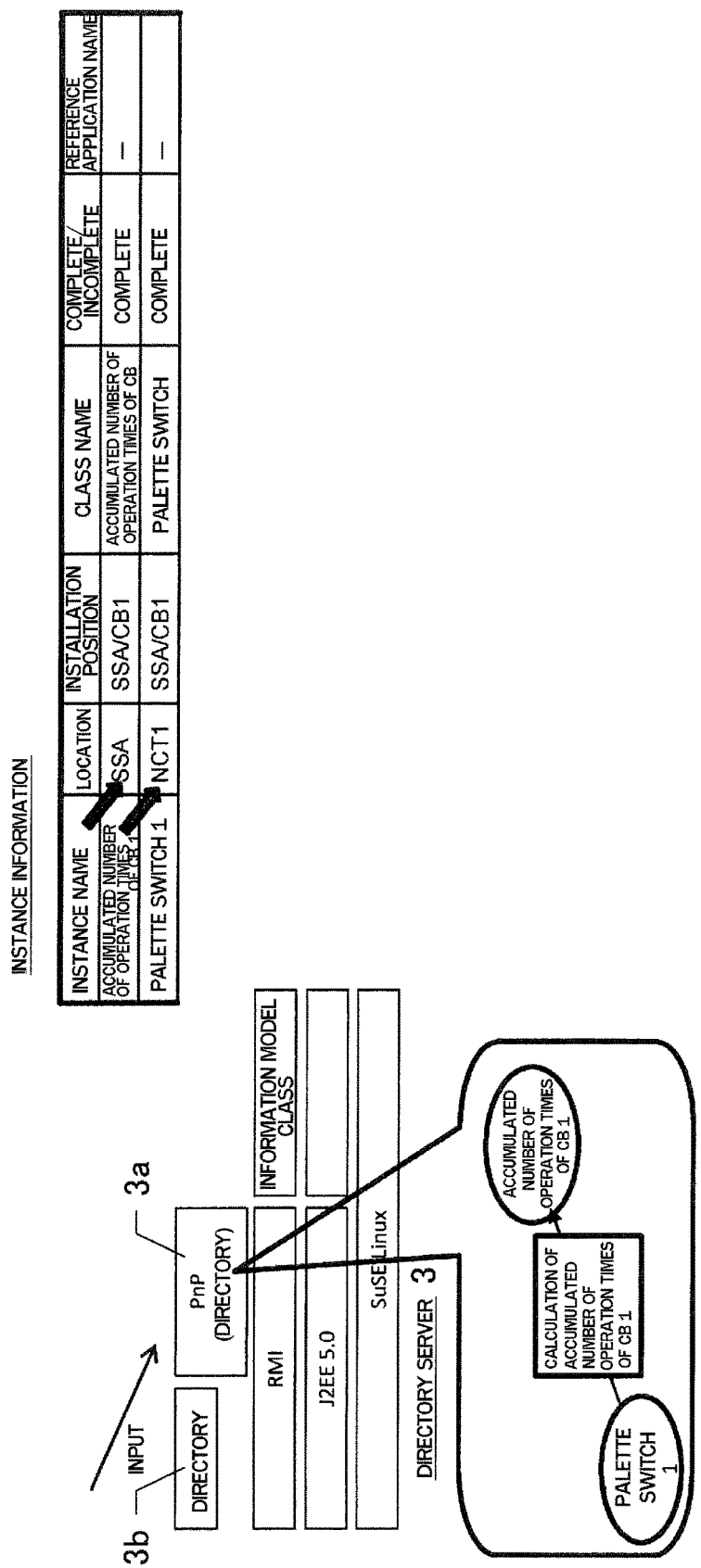
FIG. 8 is a functional block diagram for explaining an operation of the facility management system/the facility maintenance system of the embodiment and is a diagram for explaining an operation when a sensor is connected—No. 3—.
Figure 9:
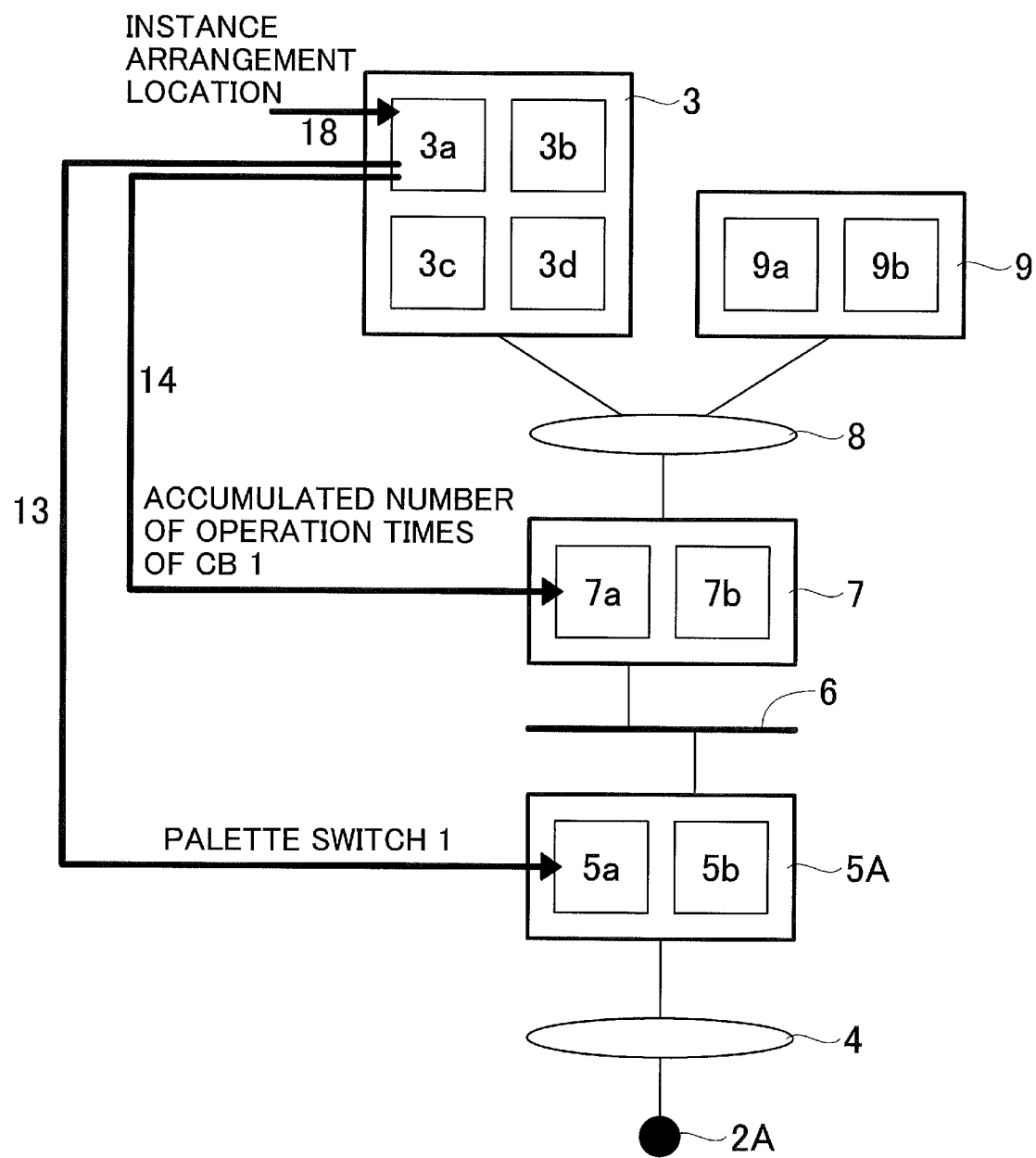
FIG. 9 is a functional block diagram for explaining an operation of the facility management system/the facility maintenance system of the embodiment and is a diagram for explaining an operation when a sensor is connected—No. 4—.
Figure 10:
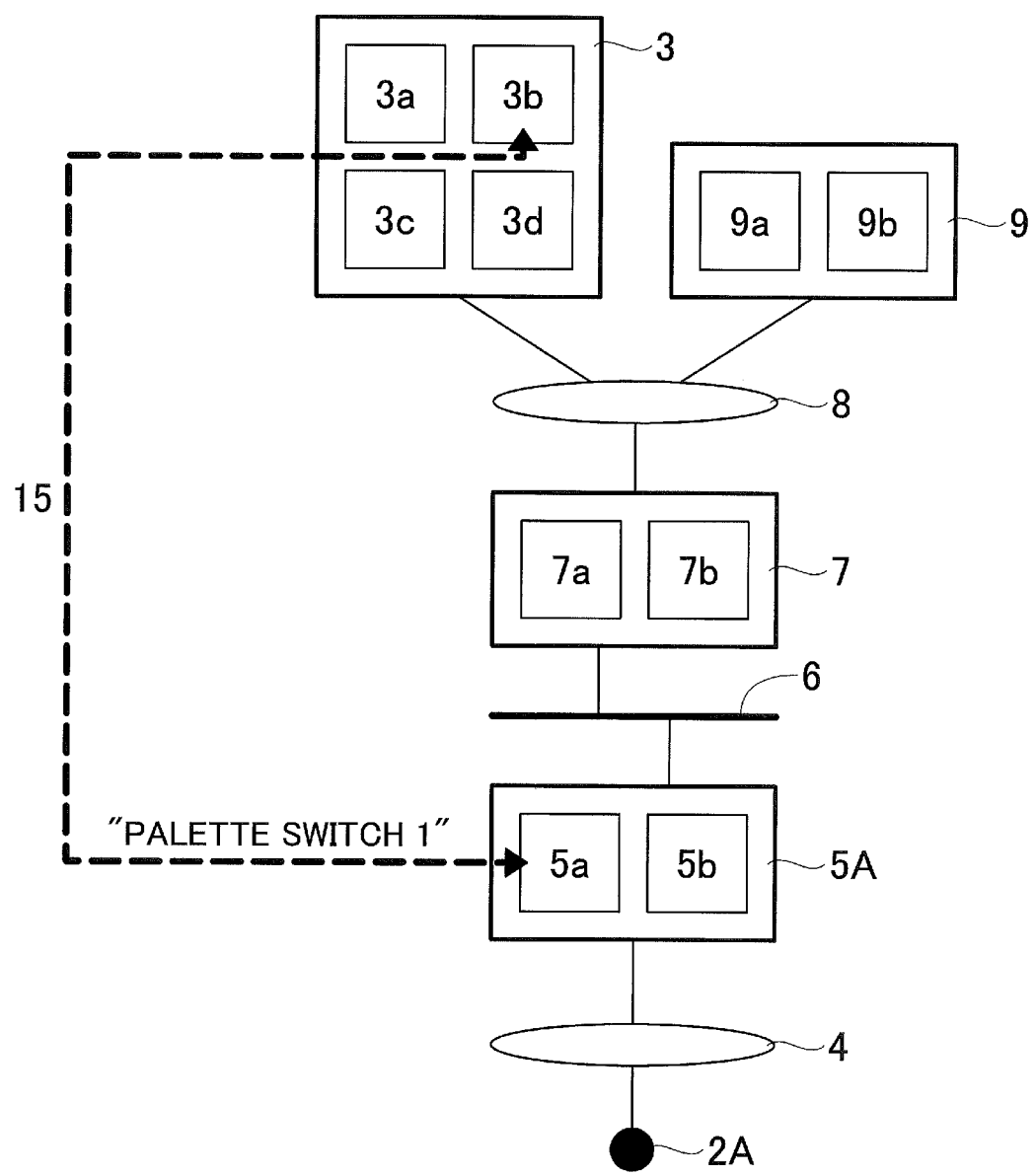
FIG. 10 is a functional block diagram for explaining an operation of the facility management system/the facility maintenance system of the embodiment and is a diagram for explaining an operation when a sensor is removed—No. 1—.
Figure 11:
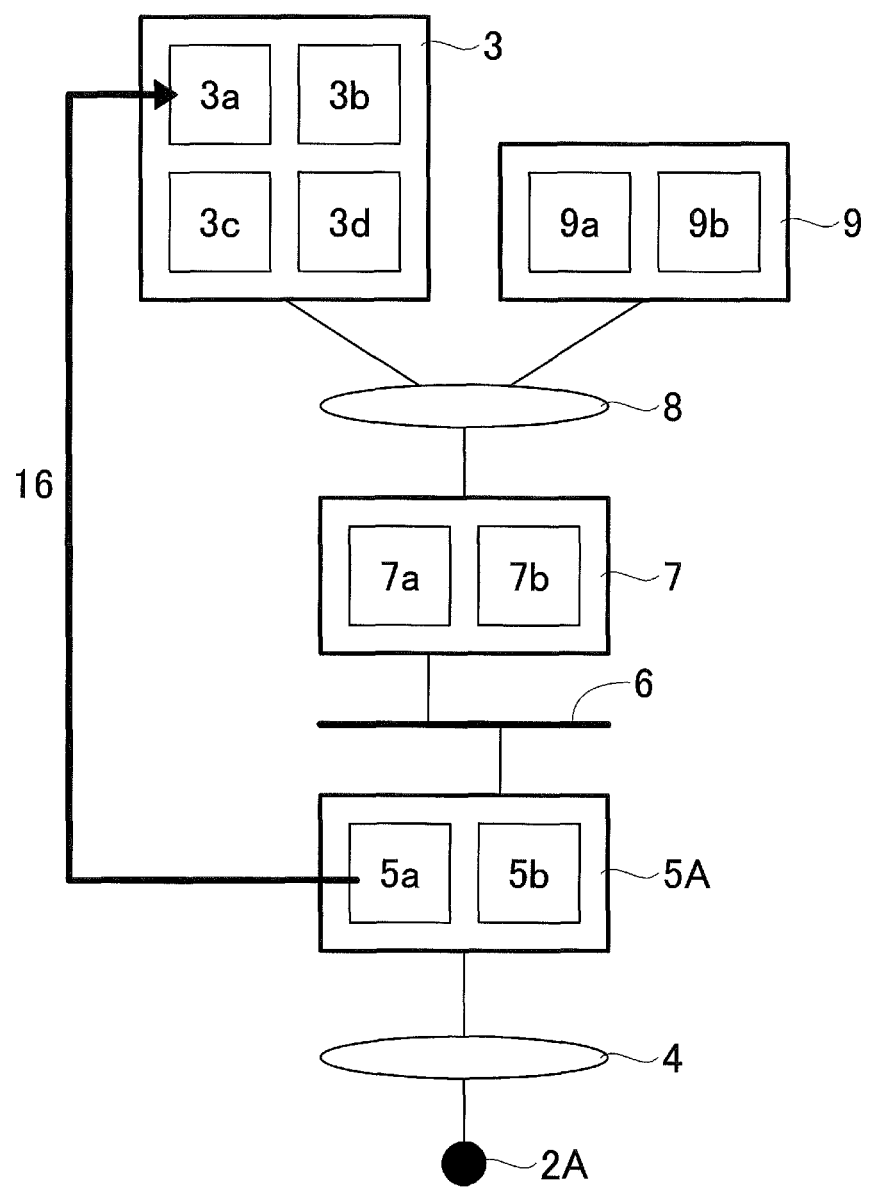
FIG. 11 is a functional block diagram for explaining an operation of the facility management system/the facility maintenance system of the embodiment and is a diagram for explaining an operation when a sensor is removed—No. 2—.

A computer in which the instances generated by the plug-and-play module 3a of the directory server 3 are arranged is determined. Content of this processing is illustrated in FIGS. 8 and 9. In FIGS. 8 and 9, the "location" in the "instance information" represents the arrangement location of the instance. In FIG. 8, a solid line ellipse represents an instance in the "complete state", that is, the state in which processing of the facility management data is performed. The determination of the arrangement is performed by inputting the arrangement location of each instance specified by an operator into the plug-and-play module 3a. This process is represented by reference numeral 18 in FIG. 9.

Then, the generated instances are transferred from the plug-and-play module 3a of the directory server 3 to a plug-and-play module of each specified computer. In the examples illustrated in FIGS. 8 and 9, as represented by reference numeral 13 in FIG. 9, the instance "palette switch 1" is transferred to the plug-and-play module 5a in the measuring-instrument reading device 5A, and as represented by reference numeral 14 in FIG. 9, the instance "accumulated number of operation times of CB 1" is transferred to the plug-and-play module 7a in the transformer substation server 7. The measuring-instrument reading device 5A is represented as "NCT1" in the "location", that is, the installation location of the instance, in the "instance information" in FIG. 8, and the transformer substation server 7 is represented as "SSA" in the "location", that is, the installation location of the instance, in the "instance information" in FIG. 8.

The transmission of each instance from the plug-and-play module 3a of the directory server 3 to the plug-and-play module 5a of the measuring-instrument reading device 5A and the plug-and-play module 7a in the transformer substation server 7 is performed by using, for example, RMI (abbreviation of Remote Method Invocation).

Then, the plug-and-play module 3a registers the location of each instance in the directory 3b in the directory server 3.

The plug-and-play module that accepts the instance retrieves information necessary to update data from the directory 3b in the directory server 3 and transfers the information to a data update module. The information necessary to update data is information represented by a relation instance of the inter-instance relationship, specifically, an instance on the data providing side and getter thereof and an instance on the data saving side and setter thereof. The details of the data update module will be described later in (7). Thereafter, according to content of (7) described later, data of an object instance that handles management information is updated at a frequency set in advance or each time a state change occurs. In the present embodiment, the data update module is arranged in the data management device 7 and the facility maintenance application server 9.

When comparing the configuration illustrated in FIG. 6 and the like with the configuration of the present invention, the "data reception side" in the "inter-class relationship" in figures represents the class name corresponding to the higher level facility management data, the "data transmission side" represents the class name corresponding to the lower level facility management data used to generate the higher level facility management data, the "details of relationship" represents how to use the lower level facility management data used to generate the higher level facility management data, and the "generated instance" represents the name of the relation instance generated corresponding to the combination of a class corresponding to the higher level facility management data and a class corresponding to the lower level facility management data. The "reception instance name" in the "inter-instance relationship" in figures represents the name of the instance arranged in the higher level device and the "transmission instance name" represents the name of the instance arranged in the lower level device.

The "data transmission side" in the "inter-class relationship" in FIG. 6 is a class of a transmission side of the facility management data and the "data reception side" is a class of a reception side of the facility management data. Specifically, the "calculation of the accumulated number of operation times of CB" in the third row of the table of the "inter-class relationship" means that a state of the palette switch, that is, ON/OFF, is transmitted from the "palette switch" class to the "accumulated number of operation times of CB" class. The "transmission instance name" in the "inter-instance relationship" in FIG. 6 is an instance of a transmission side of the facility management data and the "reception instance name" is an instance of a reception side of the facility management data. Specifically, the "calculation of the accumulated number of operation times of CB 1" in the table of the "inter-instance relationship" means that the facility management data is transmitted from the "palette switch 1" instance to the "accumulated number of operation times of CB 1" instance.

ii) Behavior when Sensor is Removed

Next, behavior when the sensor 2A is removed from the measuring-instrument reading device 5A will be described below.

—Step 1—

The removing of the sensor 2A is detected by the plug-and-play module 5a of the measuring-instrument reading device 5A. Here, it is recognized that the instance corresponding to the removed sensor 2A is the "palette switch 1" on the basis of the instance information in the directory 3b in the directory server 3. This process is represented by reference numeral 15 in FIG. 10.

—Step 2—

The plug-and-play module 5a of the measuring-instrument reading device 5A notifies the plug-and-play module 3a of the directory server 3 that the sensor 2A is removed and also notifies the plug-and-play module 3a of the instance name and the device name of the removed sensor 2A. This process is represented by reference numeral 16 in FIG. 11.

—Step 3—

Figure 12:
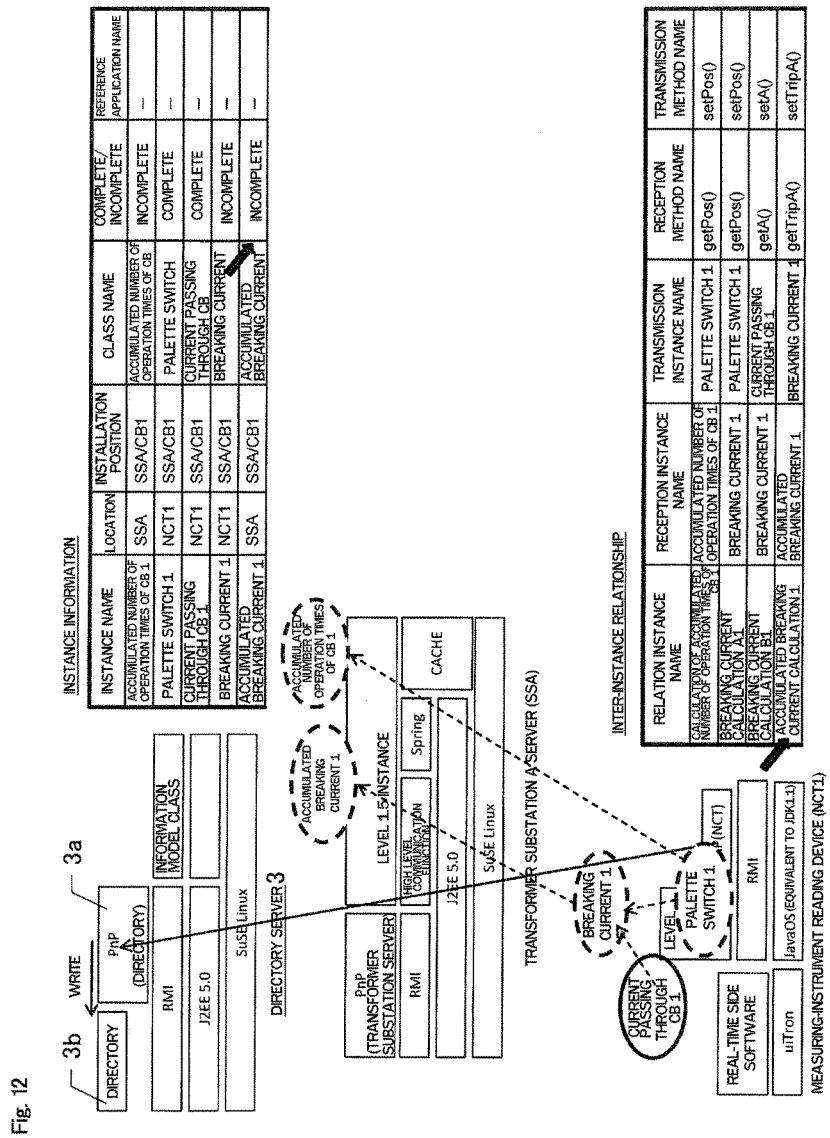
FIG. 12 is a functional block diagram for explaining an operation of the facility management system/the facility maintenance system of the embodiment and is a diagram for explaining an operation when a sensor is removed—No. 3—.
Figure 13:
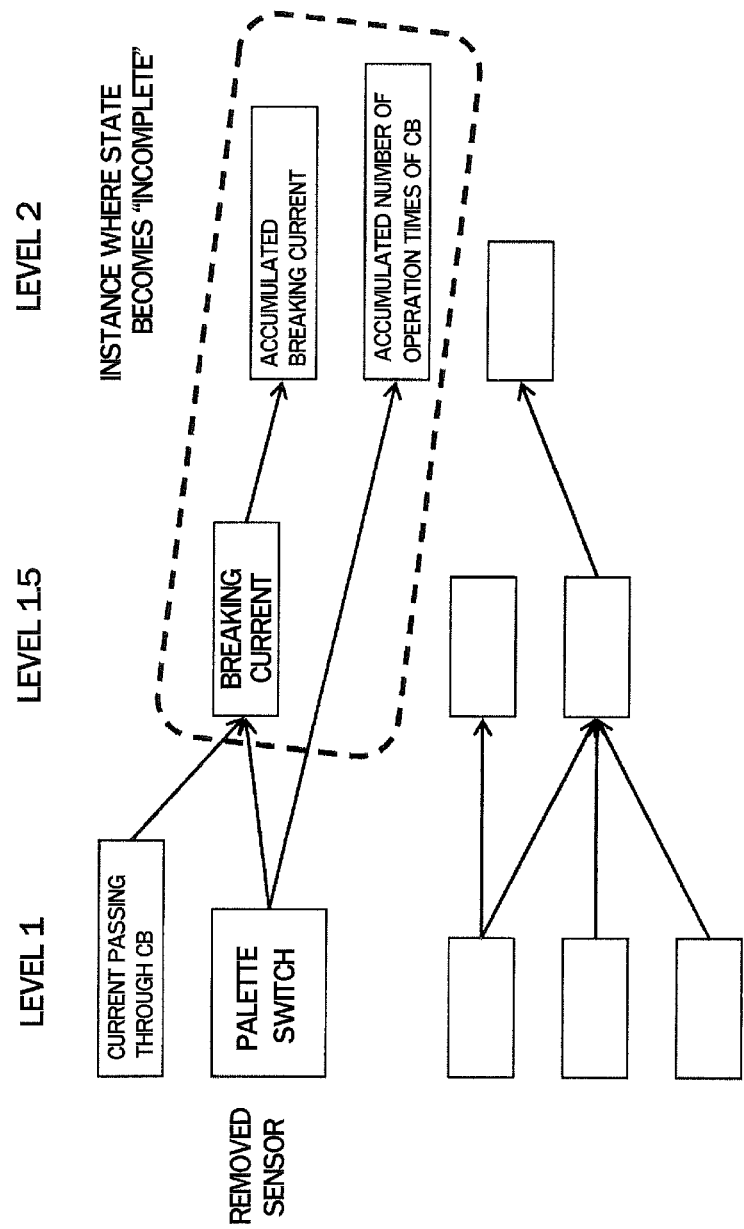
FIG. 13 is a diagram for explaining an object for each level and a transition to an "incomplete" state.
Figure 14:
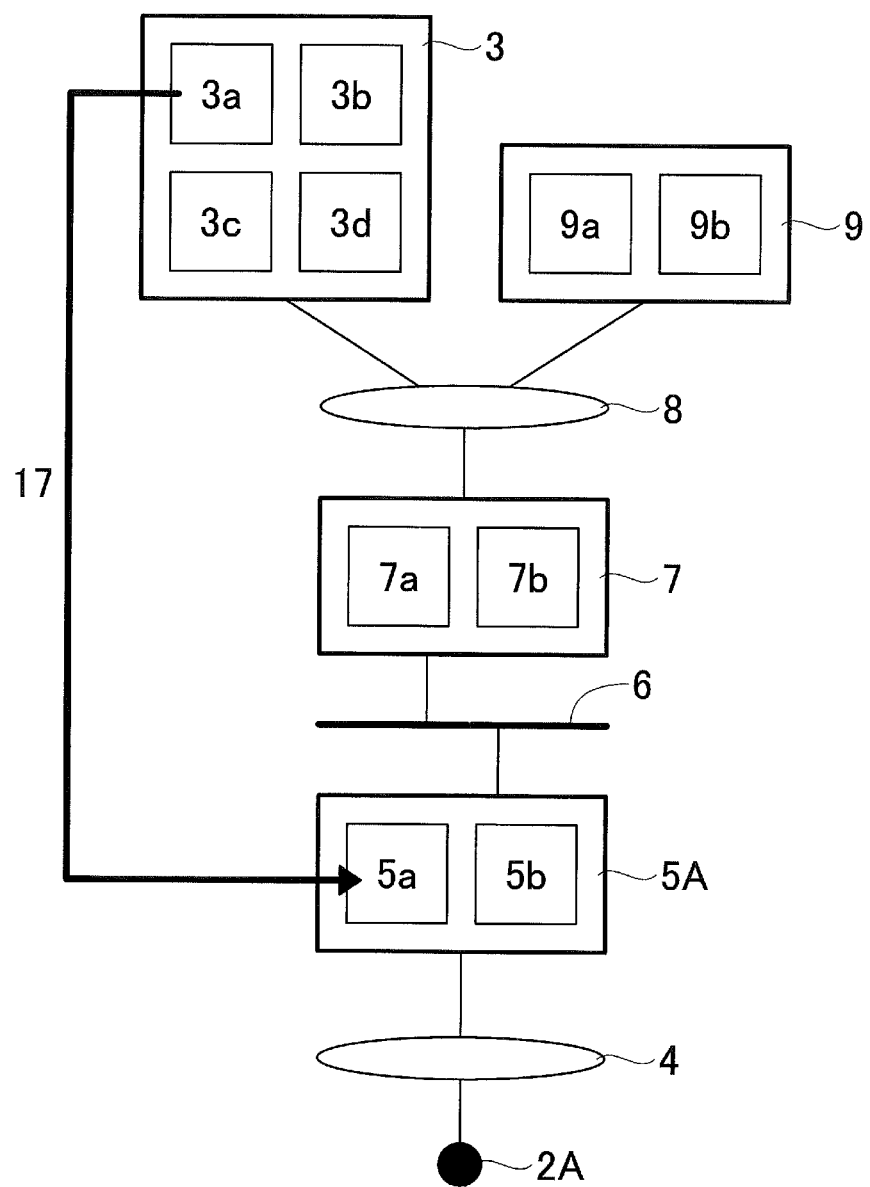
FIG. 14 is a functional block diagram for explaining an operation of the facility management system/the facility maintenance system of the embodiment and is a diagram for explaining an operation when a sensor is removed—No. 4—.

The plug-and-play module 3a of the directory server 3 that receives the notification searches a level tree of instances and recursively changes a state of instances of Level 1.5 or higher which do not have all necessary data due to the deletion of the sensor instance to an "incomplete" state and writes the state in the directory 3b. Content of this processing is illustrated in FIGS. 12 and 13. In FIG. 12, a solid line ellipse represents an instance of a "complete state" which is a state in which processing of the facility management data is performed, a dashed line ellipse represents an instance of an "incomplete state" which is a state in which processing of the facility management data is not performed, and a dashed line arrow represents a flow of the facility management data.

—Step 4—

The plug-and-play module 3a of the directory server 3 instructs the plug-and-play module of the device that has the sensor instance to delete the sensor instance and the plug-and-play module that receives the instruction deletes the instance. This process is represented by reference numeral 17 in FIG. 14. In the present embodiment, the device that has the sensor instance is the measuring-instrument reading device 5A and the plug-and-play module is an element represented by reference numeral 5a.

By this specification, in the system of the present invention, instances of Level 1.5 or higher which are once generated are recursively made into the "incomplete" state. However, the instances are not deleted from the system even when the sensor is removed.

(4-2) Functional Specification of Each Module

As described above, the function of the plug-and-play implemented in the present invention varies depending on the devices. Table 1 illustrates a relationship between function and device in which a plug-and-play module that implements the function is running. In Table 1, the horizontal axis represents plug-and-play module running in each device.

Figure 15:
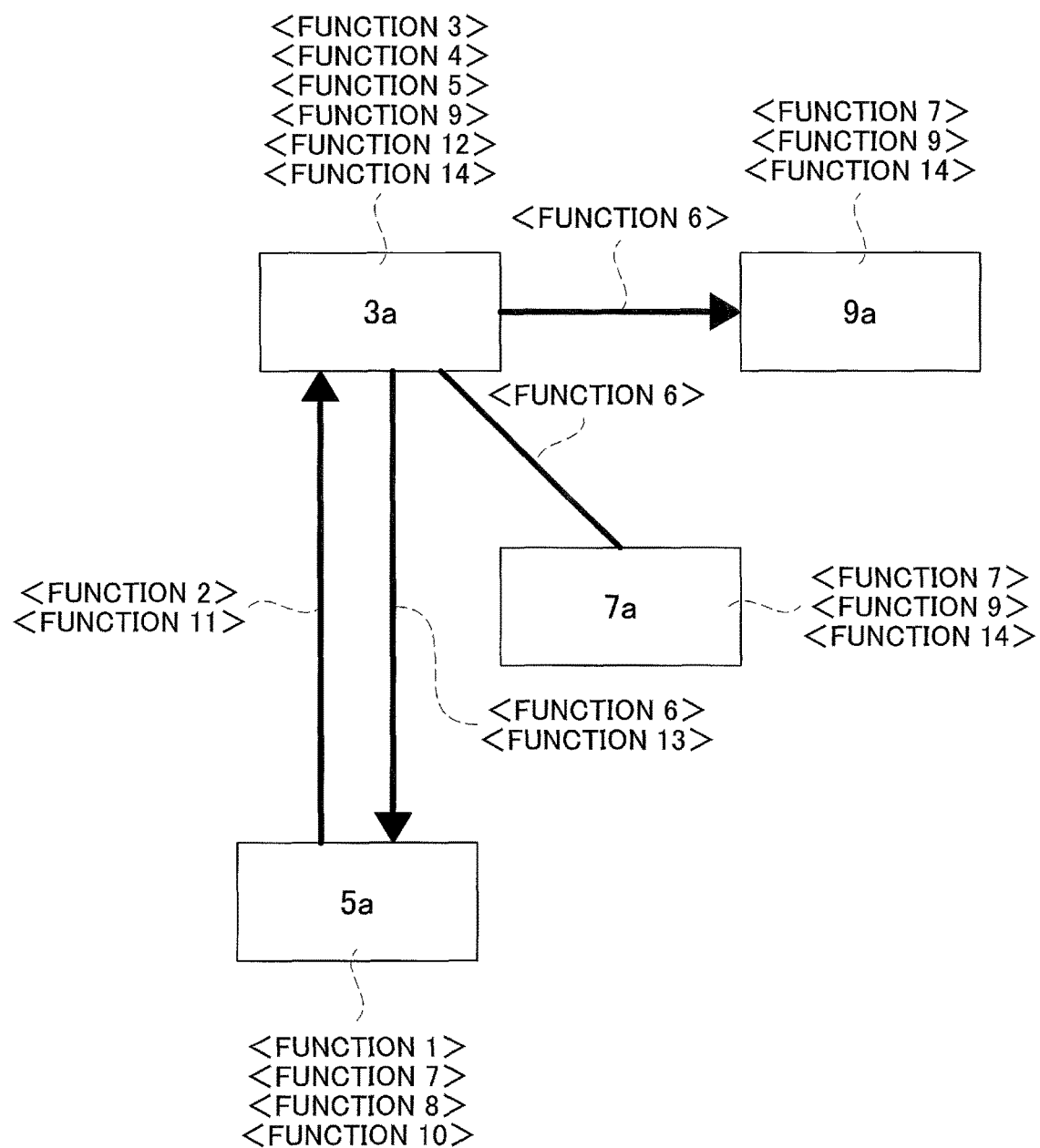
FIG. 15 is a diagram for explaining an arrangement of plug-and-play functions and data exchange between the plug-and-play functions.

FIG. 15 illustrates locations where each function described in Table 1 is implemented in the system of the present invention.

In the description below, the <Function 1> to the <Function 14> described in Table 1 are classified into [Function group A] to [Function group F] and functions implemented by each plug-and-play module will be described.

i) Function Group A

The function group A includes functions implemented by the plug-and-play module 5a of the measuring-instrument reading device 5A. Specifically, the functions are as follows.

<Function 1> Detection of Sensor Connection

The Function 1 detects that the sensor 2A which is the measuring instrument is connected.

<Function 10> Detection of Sensor Removal

The Function 10 detects that the sensor 2A is removed.

<Function 8> Reflection of instrument monitoring data to information model instance The Function 8 reflects an instrument monitoring calculation result at any time to an information model instance held by the measuring-instrument reading device 5A which is the measuring-instrument reading device.

ii) Function Group B

The function group B includes functions implemented by the plug-and-play module 3a of the directory server 3. Specifically, the functions are as follows.

TABLE 1

| Function number | Function (Content) | Measuring-instrument reading device (Information terminal) | Transformer substation server | Directory server | Maintenance server |
|---|---|---|---|---|---|
| Function 1 | Detection of sensor connection | ○ | X | X | X |
| Function 2 | Notification of sensor connection | ○ (Notify) | X | ○ (Receive notification) | X |
| Function 3 | Generation of Information model instance | X | X | ○ | X |
| Function 4 | Association between information model instances | X | X | ○ | X |
| Function 5 | Specification of transfer-destination of information model instance | X | X | ○ | X |
| Function 6 | Arrangement of information model instance | ○ (Receive) | ○ (Receive) | ○ (Transmit) | ○ (Receive) |
| Function 7 | Publication of information model instance to outside | ○ | ○ | X | ○ |
| Function 8 | Reflection of instrument monitoring data to information model instance | ○ | X | X | X |
| Function 9 | Search of information model inter-instance relationship → notification to data update module | X | ○ | ○ | ○ |
| Function 10 | Detection of sensor removal | ○ | X | X | X |
| Function 11 | Notification of sensor removal | ○ (Notify) | X | ○ (Receive notification) | X |
| Function 12 | Update of information of related information model instance | X | X | ○ | X |
| Function 13 | Deletion of information model instance | ○ (Delete) | X | ○ (Instruct deletion) | X |
| Function 14 | Transition to incomplete state | X | ○ | ○ | ○ |

○: Implemented/X: Not implemented

<Function 3> Generation of Information Model Instance

The Function 3 performs processing according to the steps described below.

—Step 1—

By the function of "<Function 2> Notification of sensor connection", "type of sensor", "purpose of connecting the sensor (purpose of installation)", and "name of main device to be monitored (position where the sensor is installed)" are given from the plug-and-play module 5a of the measuring-instrument reading device 5A.

—Step 2—

The Function 3 detects information model classes corresponding to the "type of sensor" and the "purpose of connecting the sensor (purpose of installation)" by referring to the "class information" in the directory 3b in the directory server 3 and generates the information model instances of the information model classes.

—Step 3—

The Function 3 detects an entry where the "purpose of connecting the sensor (purpose of installation)" is a higher level class by referring to the "inter-class relationship" information in the directory 3b and generates object instances of all classes lower than that of the entry.

<Function 4> Association Between Information Model Instances

The Function 4 performs processing according to the steps described below.

—Step 1—

The Function 4 checks whether the same instance as the instance generated by the "<Function 3> Generation of information model instance" exists or not by searching the "instance information" in the directory 3b in the directory server 3. If the same instance exists, the Function 4 deletes the instance generated by the <Function 3>, and if the same instance does not exist, the Function 4 registers the instance generated by the <Function 3>.

—Step 2—

The Function 4 performs an instantiation of the inter-class relationship entry detected in the process of step 3 in <Function 3>, in other words, generates a relation instance by referring to the inter-class relationship, and registers the relation instance in an "inter-instance relationship" table.

<Function 5> Specification of Transfer-Destination of Information Model Instance In the system of the present invention, a file in which an arrangement-destination of each information model instance is described is placed in an arrangement-destination information management unit 3c in the directory server 3 in advance, and transfer-destination of information model instance is determined according to the content of the file.

<Function 12> Update of Information of Related Information Model Instance

The Function 12 performs processing according to the steps described below.

—Step 1—

The Function 12 searches the "inter-instance relationship" table in the directory 3b in the directory server 3, detects an entry where the sensor instance to be deleted is in "lower level", and makes the state of the higher level instance of the entry into "incomplete".

—Step 2—

In the above process, the Function 12 detects an entry where the higher level instance is in "lower level", and if the entry is detected, the Function 12 makes the higher level instance of the entry into "incomplete". This process is recursively repeated.

iii) Function Group C

The function group C includes a function implemented by the plug-and-play module 7a of the transformer substation server 7 and a plug-and-play module 9a of the maintenance server 9. Specifically, the function is as follows.

<Function 9> Search of Information Model Inter-Instance Relationship→Notification to Data Update Module The Function 9 performs processing according to the steps described below.

—Step 1—

The Function 9 searches the "inter-instance relationship" table in the directory 3b in the directory server 3 and searches for an entry where the information model instance held by the entry is registered as a "higher level instance".

—Step 2—

If there is an entry that satisfies the condition of step 1, the Function 9 notifies the data update module of the following information:

1) URL of a lower level instance for acquiring data of the lower level instance and a getter name 2) URL of a higher level instance which is a destination to which the data of the lower level instance is transferred and a setter name 3) A method of RPC (abbreviation of Remote Procedure Call) such as, for example, RMI 4) A parameter when a specification of a parameter related to the method of RPC is required Hereinafter, the Function 9 will be described by using a 20° C.-conversion gas pressure as a specific example.

The information illustrated in Table 2 as information of an inter-class relationship table is registered in the directory 3b in the directory server 3.

TABLE 2

| Inter-class relationship name | List of higher level facility maintenance data | Method name of higher level class to which lower level facility maintenance data is transferred | List of (methods that acquire) lower level facility maintenance fata |
| --- | --- | --- | --- |
| 20° C.-conversion gas pressure | (SIMG.presAmd) | {SIMG.setPresSv ( ), SIMG.setTmpSv ( )} | {TPRS.getPresSv ( ), TTMP.getTmpSv ( )} |

Figure 16:
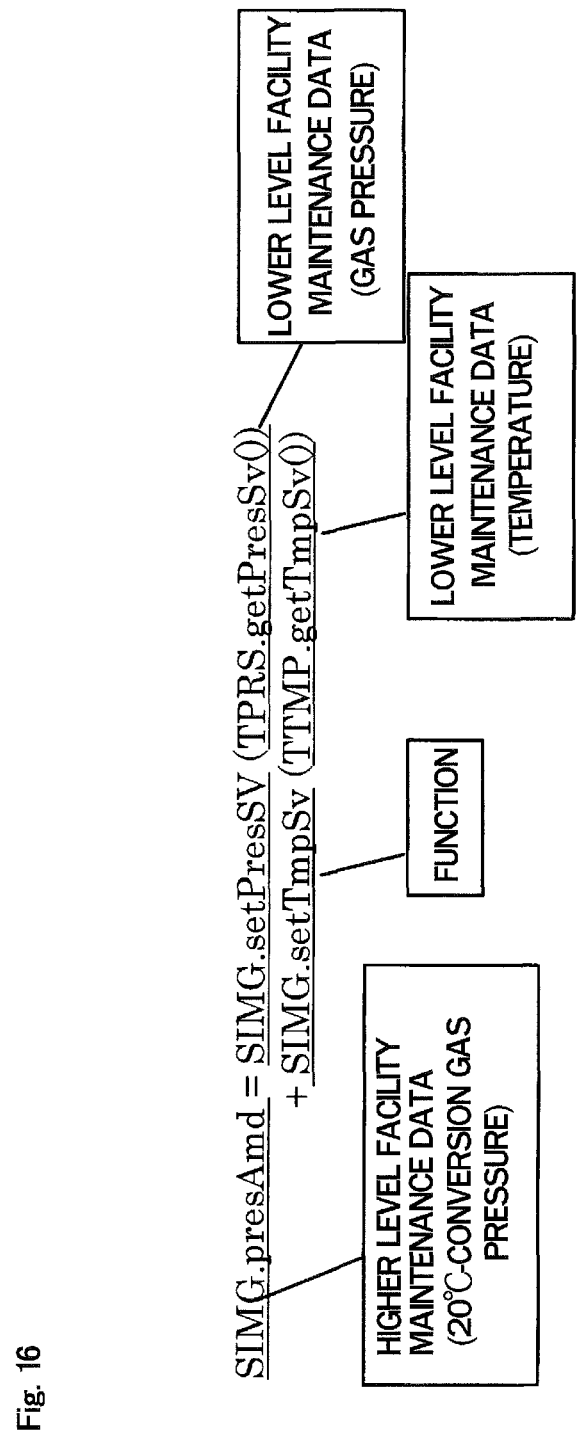
FIG. 16 is a diagram for explaining an image where higher level data is calculated from lower level data.

FIG. 16 illustrates an image to calculate higher level data from lower level data at this time. In the formula illustrated in FIG. 16, the symbol "+" does not mean a simple addition, but means that the 20° C.-conversion gas pressure is calculated from pressure and temperature.

On the other hand, the information illustrated in Table 3 as information of an inter-instance relationship table is registered in the directory 3b in the directory server 3. In Table 3 and the like, the "CB1" represents the circuit breaker.

TABLE 3

| Inter-instance relationship name | Inter-class relationship name | List of higher level facility maintenance instance names | List of lower level instance names |
| --- | --- | --- | --- |
| 20° C.-conversion gas pressure of CB1 | 20° C.-conversion gas pressure | SIMG1 | TPRS1, TTMP1 |

Similarly, the information illustrated in Table 4 as information of an instance information table is registered in the directory 3b in the directory server 3. The "XXX" in Table 4 represents a parameter related to high level communication when a specification of the parameter is required.

TABLE 4

| Instance name | URL | RPC method | "High level communication" parameter |
| --- | --- | --- | --- |
| SIMG1 | URL of SIMG1 | RMI | — |
| TPRS1 | URL of TPRS1 | RMI | — |
| TTMP1 | URL of TTMP1 | High level communication | XXX |

The plug-and-play function extracts the information illustrated in Table 5 from the information of the three tables described above and transfers the extracted information to the data update module.

TABLE 5

| | Gas pressure | Temperature |
| --- | --- | --- |
| Reference to higher level instance | URL of SIMG1 | URL of SIMG1 |
| setter method name | setPresSv | setTmpSv |
| How to call setter | RMI | RMI |
| Reference to lower level instance | URL of TPRS1 | URL of TTMP1 |
| getter method name | setPresSv | setTmpSv |
| How to call getter | RMI | High level communication |

The system of the present embodiment follows the following specifications:

1) An argument of a method "getter" that acquires data from the lower level information model instance is only a time. The getter returns data of after the time transferred by the argument.

2) The timing when data is acquired from the lower level information model instance depends on the data update module.

3) As in the example described above, when a plurality of lower level data is required, the getter processing and the setter processing are performed for each data.

iv) Function Group D

The function group D includes a function implemented by a plug-and-play module other than the plug-and-play module 3a of the directory server 3. Specifically, the function is as follows. The plug-and-play modules here are represented by reference numerals 5a, 7a, and 9a.

<Function 7> Publication of Information Model Instance to Outside

The Function 7 makes an instance transmitted from the directory server 3 into a state in which the instance can be called as a method from the outside.

v) Function Group E

The function group E includes functions implemented by cooperation of plug-and-play modules. Specifically, the functions are as follows.

<Function 2> Notification of Connection of Sensor

The plug-and-play module 5a of the measuring-instrument reading device 5A notifies the plug-and-play module 3a of the directory server 3 of information of the "type of sensor", the "purpose of connecting the sensor (purpose of installation)", and the "name of main device to be monitored (position where the sensor is installed)".

<Function 6> Arrangement of Information Model Instance

The plug-and-play module 3a of the directory server 3 transmits an information model instance to a plug-and-play module of a specified arrangement-destination.

<Function 11> Notification of Sensor Removal

The plug-and-play module 5a of the measuring-instrument reading device 5A remotely calls a method of the plug-and-play module 3a of the directory server 3 by using the "type of sensor" as an argument.

<Function 13> Deletion of Corresponding Information Model Instance

The Function 13 performs processing according to the steps described below.

—Step 1—

The Function 13 makes a method of an instructed instance into a state in which the method cannot be called from the outside.

—Step 2—

The plug-and-play module 3a of the directory server 3 issues an instruction of deletion and the plug-and-play module 5a of the measuring-instrument reading device 5 which receives the instruction deletes reference of the instance. Further, a garbage collection is performed.

vi) Function Group F

The function group F includes a function implemented by a plug-and-play module other than the plug-and-play module 5a of the measuring-instrument reading device 5. Specifically, the function is as follows. The plug-and-play modules here are represented by reference numerals 3a, 7a, and 9a.

<Function 14> Transition to Incomplete State

The Function 14 moves the state of a corresponding instance located in the measuring-instrument reading device, the transformer substation server, and the maintenance server to an incomplete state on the basis of the information of the information model instance updated by <Function 12>. The instance that transits to the incomplete state stops collection/processing of data. However, it is possible to read data stored in the instance.

(5) Directory Service

The directory service is a service running on the directory server 3. The directory service provides a function to register/retrieve/delete information required by a plug-and-play function and an application running on a facility management system.

(5-1) Schema

The directory service manages four types of information and schema of each type of information will be described below. Here, the schema is equivalent to a definition used in relational database and the schema indicates relation, attribute in the relation, and definition of attribute and relationship. The relational database is also represented as RDB (abbreviation of Relational Database).

i) Class Information

The class information represents information related to "class" in an information model. Specifically, for example, the information is managed in a tabular format illustrated by Table 6. The "xxxx" in Table 6 represents any character string that forms a URL.

TABLE 6

| Class name | Item name | URL | List of instance names |
|---|---|---|---|
| SIMG | 20° C.-conversion gas pressure | http://xxxx/SIMG.class | 20° C.-conversion gas pressure of CB1 |

Here, in the system of the present embodiment, the "class" is implemented by a class of Java (registered trademark). Meanings of each item in Table 6 are as follows:

1) Class name (key): Name of the class
2) Item name: Name of a maintenance data item
3) URL: URL as a location where a class file is stored.
4) Instance name list: List of names of instances generated from the class Regarding the class information, the class name is obtained from a class file name of an object of the facility management system, the item name is obtained from information stored in the class file, the URL as a location is obtained from a URL in which the class file is stored, and the instance name list is added each time an instance is generated from the class. The class name and the location are automatically generated by detecting that the class file is stored or given by direct input by an operator. The instance name list is added during instance generation processing.

ii) Inter-Class Relationship

The inter-class relationship represents how to use lower level facility maintenance data to generate higher level facility maintenance data. Specifically, for example, the information is managed in a tabular format illustrated by Table 7. The example of the "function to calculate higher level facility maintenance data" in Table 7 is a setter method name and an actual calculation of the facility management data is performed in the setter method.

TABLE 7

| Inter-class relationship name | List of higher level facility maintenance data | Function to calculate higher level facility maintenance data | List of (methods that acquire) lower level facility maintenance data |
|---|---|---|---|
| 20° C.-conversion gas pressure | (SIMG.presAmd) | {SIMG.setPresSv ( ), SIMG.setTmpSv ( )} | {TPRS.getPresSv ( ), TTMP.getTmpSv ( )} |

The relationship between classes is obtained by Formula 1. In Formula 1, y means the higher level facility maintenance data, (x1, x2, x3, . . . ) means the lower level facility maintenance data, and f means a function to calculate the higher level facility maintenance data. Formula 1 means that there may be a plurality of inputs and a plurality of outputs for the higher level facility maintenance data and the lower level facility maintenance data respectively.

$$y = f(x1, x2, x3, \ldots) \quad \text{(Formula 1)}$$

Figure 17:
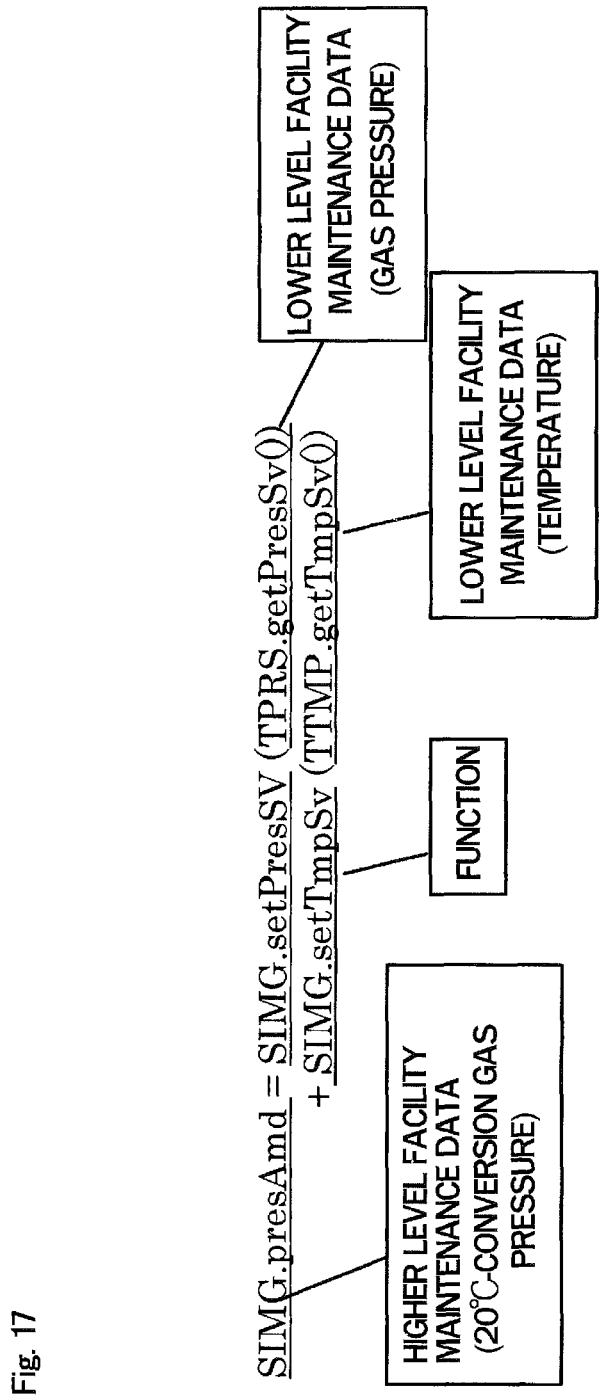
FIG. 17 is a diagram for explaining an image where higher level data is calculated from lower level data.

Referring to Formula 1, the meanings of each item in Table 7 are as follows:

1) Inter-class relationship name (key): name of the inter-class relationship
2) List of the higher level facility maintenance data: y
3) List of the lower level facility maintenance data: x1, x2, x3, . . . .
4) Function to calculate the higher level facility maintenance data: f A relational expression derived from the above information is as illustrated in FIG. 17. In the relational expression illustrated in FIG. 17, the symbol "+" does not mean a simple addition, but means that the 20° C.-conversion gas pressure is calculated from pressure and temperature.

iii) Instance Information

The instance information represents information related to "instance" in an information model. Specifically, for example, the information is managed in a tabular format illustrated by Table 8. The "xxx" in Table 8 represents any character string.

TABLE 8

| Instance name | URL | Name of device to be monitored | Class name | Complete/ incomplete | List of reference application names | RPC method | High level communication parameter |
|---|---|---|---|---|---|---|---|
| 20° C.-conversion gas pressure of CB1 | rmi://xxx/nct1/Pres | CB1 | SIMG | Complete | App1 | RMI | — |

Here, in the facility maintenance system of the present embodiment, the "instance" is implemented by an instance of Java (registered trademark). Meanings of each item in Table 8 are as follows:

1) Instance name (key): Name of the instance
2) URL: URL as a location where the instance is stored
3) Name of device to be monitored: Name identifying the main device to be monitored which is the circuit breaker here, that is, the position where the measuring instrument is installed
4) Class name: Name of a base class
5) Complete/incomplete: Distinction whether or not all facility maintenance data lower than the level of the instance are present
6) List of reference application names: List of names of applications that refer to the instance
7) RPC method: Specification of RMI or another method which remotely calls the method of the information model instance 8) RPC method parameter: Parameter that is transferred to a communication function when a parameter needs to be specified by the method which remotely calls the method iv) Inter-Instance Relationship The inter-instance relationship, strictly speaking, the relation instance of the inter-instance relationship, represents a method to actually exchange data between instances. Specifically, for example, the information is managed in a tabular format illustrated by Table 9.

TABLE 9

| Inter instance relationship name | Inter class relationship name | List of higher level facility maintenance instance names | List of lower level instance names |
|---|---|---|---|
| 20° C.-conversion gas pressure of CB1 | 20 ° C.-conversion gas pressure | SIMG1 | TPRS1, TTMP1 |

Figure 18:
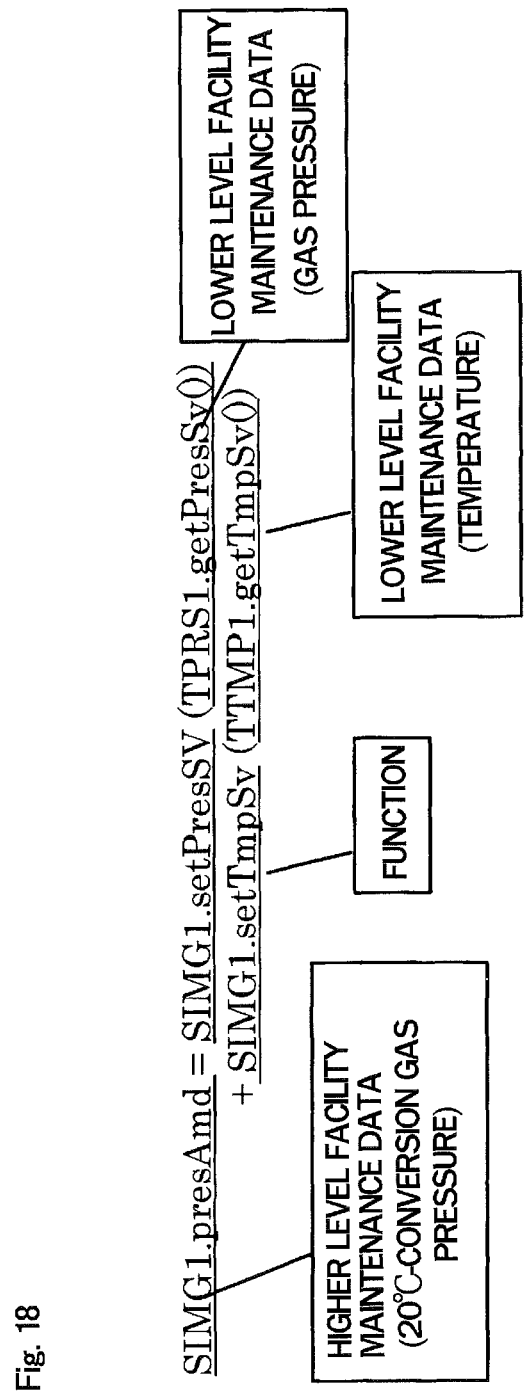
FIG. 18 is a diagram for explaining an image where higher level data is calculated from lower level data.

Meanings of each item in Table 9 are as follows:

1) Inter-instance relationship name (key): Name of the inter-instance relationship, in other words, name of the relation instance 2) Inter-class relationship name: Name of the inter-class relationship, in other words, name of the relation class 3) List of higher level instances: Names of all instances that receive the facility maintenance data 4) List of lower level instances: Names of all instances that transmit the facility maintenance data A relational expression derived from the inter-instance relationship and the inter-class relationship associated with the inter-instance relationship is as illustrated in FIG. 18. In the relational expression illustrated in FIG. 18, the symbol "+" does not mean a simple addition, but means that the 20° C.-conversion gas pressure is calculated from pressure and temperature.

(5-2) Service

Four services described below are provided to the plug-and-play function and the applications running on the facility management system.

i) Data Registration

The data registration is a function to register the four pieces of schema information described in (5-1).

ii) Data Search

The data search is a function to search for the four pieces of schema information described in (5-1).

iii) All Data Acquisition

The all data acquisition is a function to return all information held by the directory service in each of the four pieces of schema information described in (5-1).

iv) Data Deletion

The data deletion is a function to delete information in each of the four pieces of schema information described in (5-1).

(6) Information Model

Regarding an information model that handles the maintenance information, an information model of IEC 61850 and a common information model (CIM: abbreviation of Common Information Model) are separately used for each layer described in the system architecture. Specifically, the information model of IEC 61850 is used in the Level 1 and the Level 1.5, and the common information model is used in the Level 2 and the Level 3.

An interface defined by a standard is used. For example, when using IEC 61850, ACSI (abbreviation of Abstract Communication Service Interface) is used. Further, an originally defined method may be used.

Figure 19:
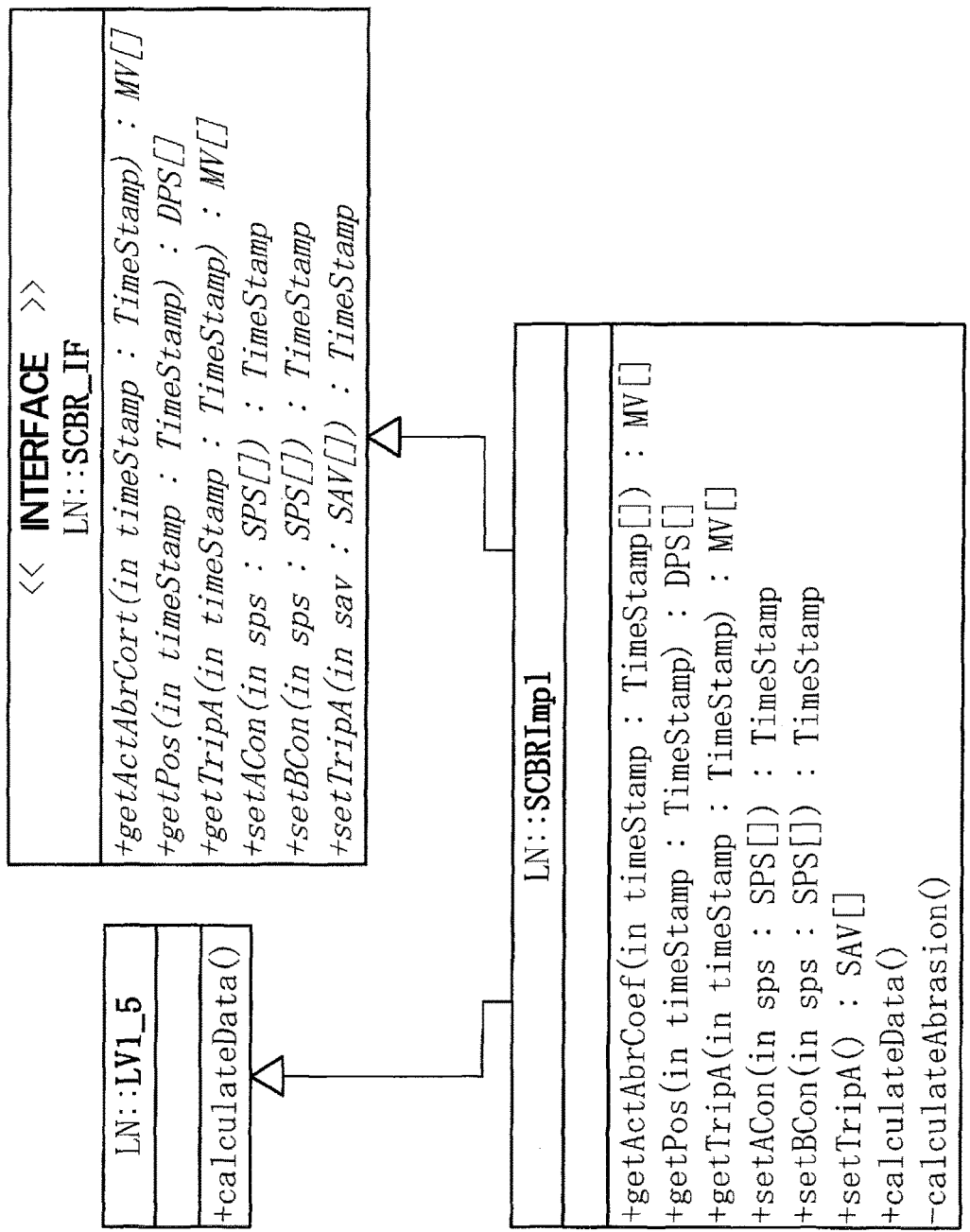
FIG. 19 is a diagram for explaining a definition of an object class corresponding to a logical node "SCBR".

Regarding the originally defined method, specifically, a measurement value is transferred by using an array of common data classes and a monitoring item is specified by using the method name. Regarding an information model based on the IEC 61850, one logical node is formed by a class according to level, an interface, and an implementation class. As an example of the above, FIG. 19 illustrates SCBR which is a logical node that diagnoses the circuit breaker, that is, a definition of an object class corresponding to an information model that performs processing of a contact point attrition rate of the circuit breaker. Three object classes of LV1_5, SCBR_IF, and SCBRImpl are used to implement the SCBR. These object classes correspond to the class according to level, the interface, and the implementation class, respectively.

The <LV1_5> is an object class that defines characteristics held by all logical nodes arranged in the Level 1.5. Specifically, a calculateData method that processes the facility maintenance data and calculates the contact point attrition rate of the circuit breaker in a logical node arranged in the Level 1.5 is prepared as a virtual method. The virtual method is a function of object-oriented technique which does not define a processing substance in a higher class but defines processing of a method having the same name in a class derived from that class and in which the method in the derived class can be called from a calling side by calling a method in the higher class.

The <SCBR_IF> defines a method that can be accessed from an external software module. Here, the external software module indicates an information model and a data update module located in a different level. When monitoring the contact point attrition rate by using the SCBR, for example, three types of getters that provide the facility maintenance data to the external software module and three types of setters that register data from the outside are prepared. The functions as seen from the calling side are as follows:

<Getter>

A time is specified as a parameter. Each method returns the facility maintenance data after the time. The facility management data are arranged in a chronological order. The type of the facility management data is a corresponding common data class.

1) getActAbrCoef: acquires a value of the contact point attrition rate.

2) getPos: acquires a position of the opening/closing device, specifically, acquires closed/open/during switching.

3) getTripA: acquires a value of a breaking current.

<Setter>

An arrangement of the facility maintenance data to be stored is specified as a parameter. A time of the latest facility management data among the saved facility management data is returned.

1) setACon: store data of an A contact point.

Here, the A contact point is a contact point which turns ON when the circuit breaker is closed.

2) setBCon: store data of a B contact point.

Here, the B contact point is a contact point which turns ON when the circuit breaker is open.

3) setTripA: stores an instantaneous value of the breaking current.

The <SCBR_IF> is an interface, so that the <SCBR_IF> does not have a specific processing procedure.

An implementation class <SCBRImpl> defines a specific processing procedure of a method defined by the <LV1_5> and the <SCBR_IF>. In other words, the implementation class inherits the <LV1_5> and implements the <SCBR_IF>. When defining or additionally using a different processing method, it is possible to define another object class that inherits the <LV1_5> and implements the <SCBR_IF>, such as for example, <SCBRImp12>. Even in this case, the other object class is seen as the <SCBR_IF> from the external software module, so that it is not necessary to modify the external software module.

(7) Data Update Module

In the plug-and-play function of the present invention, the facility management data is collected based on a polling method. The data correction is performed by the data update module. The setting of the polling method is simple. Specifically, only an object that holds data to be collected by the data update module and an object in which the data is stored have to be controlled, so that a unitary management can be performed. The polling method periodically performs data collection, so that there is no quick responsiveness to a change of state. However, the quick responsiveness is not so much required in a use in which a management work is determined based on data obtained as a result of calculation, so that there is no major problem. The data update module is stored in all levels higher than or equal to the <Level 1.5> in the four-layer system architecture.

Figure 20:
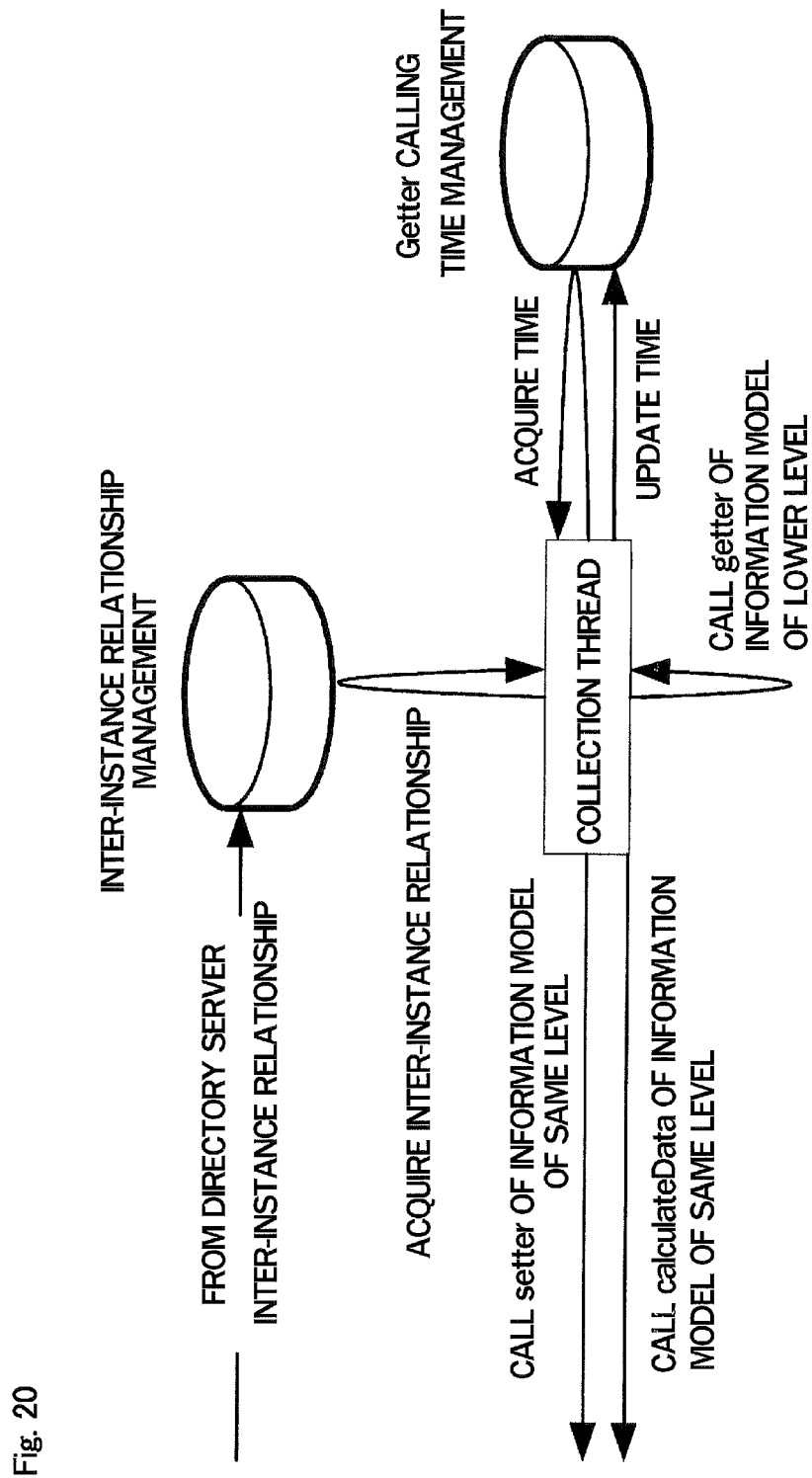
FIG. 20 is a diagram for explaining an internal configuration of a data update module.

FIG. 20 illustrates an internal configuration of the data update module. The data update module is formed from three aspects described below.

i) Inter-Instance Relationship Management

In the inter-instance relationship management, a relationship between an information model from which information is collected and a location where the information is stored is managed in a list structure. This process has been described in the above "Inter-instance relationship in (5) Directory server". As the inter-instance relationship, strictly speaking, as the relation instance of the inter-instance relationship, all pieces of information described below are stored as a character string. In the description below, information on the right of the colon is a data example.

Information source class name: dam61850.logicalnode.1.TCTR
        Information source instance URL: TCTR1
        getter method name: getAmdSv
        Storage-destination class name: dam61850.logicalnode.s.SCBR
        Storage-destination instance name: SCBR1
        setter method name: setTripA
        setter parameter class name: dam61850.cdc.SAV TCTR, SCBR, SAV are international standards of IEC 61850. Outlines of each of the above will be described. The TCTR is an object corresponding to a current sensor and the TCTR has a function to manage and provide a sampling value of current and the like. The SCBR is an object that manages all maintenance information of the circuit breaker and the SCBR has a function to process/manage/provide the value of the contact point attrition rate in the case of the present embodiment. The SAV is a data type representing a sampling data, and the sampling value of current in the TCTR is represented by using the SAV.

ii) Getter Calling Time Management

In the getter calling time management, by using a character string combining the information source instance URL and the getter method name as a key, corresponding times are managed as a pair. The time is a value returned from the setter method of the storage-destination instance. Thereby, it is possible to identify a time range of data to be collected from a lower level.

iii) Collection Thread

Figure 21:
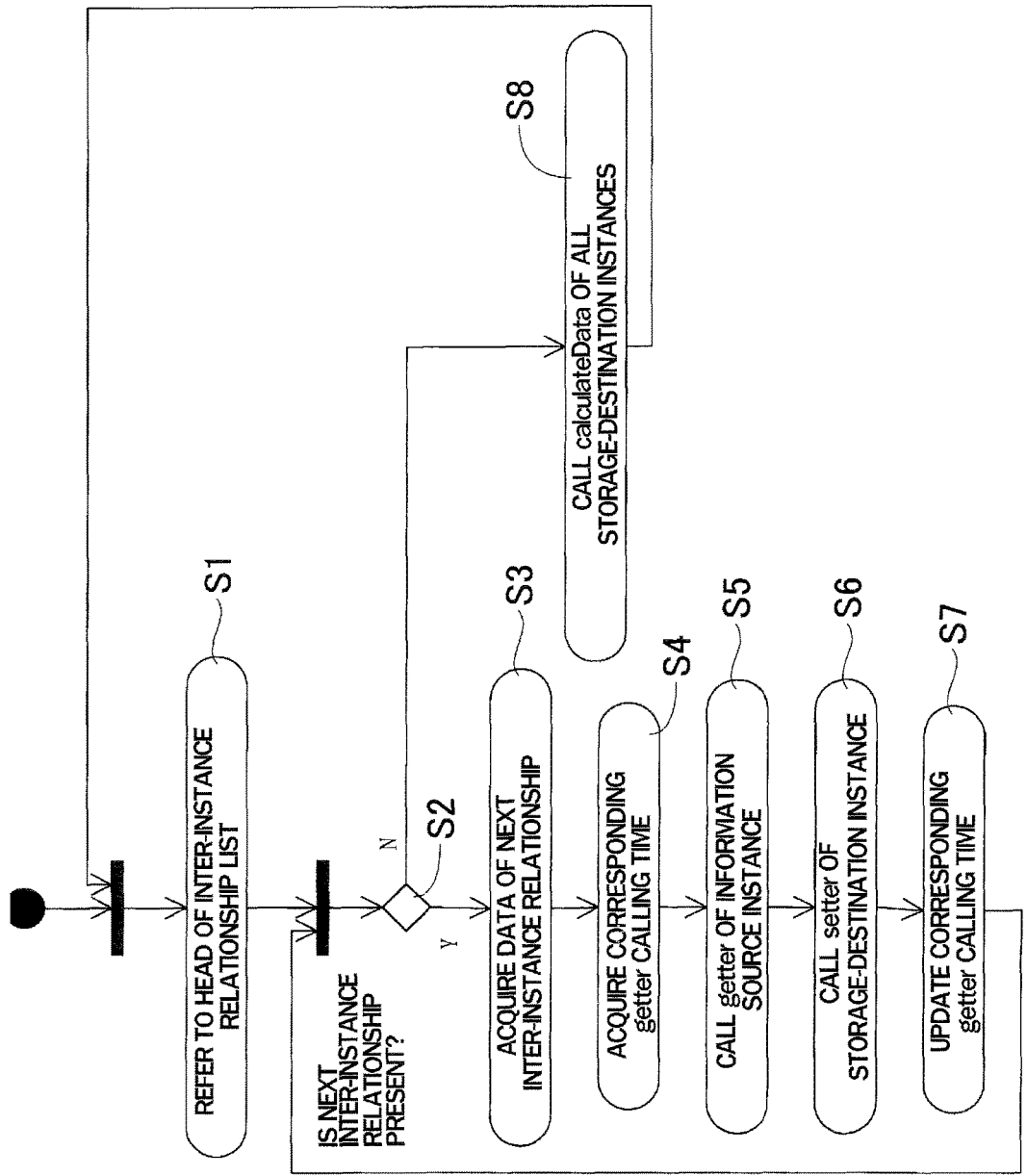
FIG. 21 is a diagram for explaining a process flow in a collection thread in the data update module.

The collection thread performs collection and storage of the facility management data. FIG. 21 illustrates a processing flow of the above by using an activity diagram of UML (abbreviation of Unified Modeling Language). The UML is a notation convention for representing a design result of software and is defined by OMG (abbreviation of Object Management Group), which is an organization that makes industry standards of object-oriented technique. The UML is widely used in a field of software.

The processing content related to the collection and storage of the facility management data by the collection thread is as follows: First, the collection thread refers to the head of the inter-instance relationship list (S1) and determines whether or not the next inter-instance relationship is present (S2). If the next inter-instance relationship is present (S2: Y), the collection thread acquires data of the next inter-instance relationship (S3).

Then, the collection thread calls the getter of the information source instance on the basis of the data of the inter-instance relationship acquired in the process of S3 and acquires the facility management data (S5). At this time, when calling the getter, the collection thread acquires a getter calling time of the latest data that has been acquired from the getter calling time management, in other words, a corresponding getter calling time, and specifies this as a parameter of the getter method (S4). All the inter-instance relationship data is a character string, so that the collection thread has a mechanism to call a method based on this information. Specifically, for example, it is considered to implement the mechanism by using reflection. The reflection is a technique that reads a structure of a program and rewrites the structure in an execution process of the program. In other words, it is possible to acquire reference data on a program from a name of a method, specifically, from a character string. As languages that support the reflection, there are Java (registered trademark), C#, Perl, Objective-C, and the like.

The facility management data acquired in the process of S5 is stored in the storage-destination instance indicated by the inter-instance relationship through a calling of the setter method (S6). A time received as a return value of the setter method is used to update a corresponding getter calling time of the getter calling time management (S7). The above process is repeatedly performed for each data stored in the inter-instance relationship management (S1, S2: Y, S3 to S7). Each time the collection thread returns from the process of S7 to the process of S2, the collection thread advances processing targets of S2 in the inter-instance relationship list by one step.

When the processing related to all the data is completed and the next inter-instance relationship is absent in the inter-instance relationship list (S2: N), the collection thread calls the calculateData method of the storage-destination instance in order to process the facility management data, for example, calculate the contact point attrition rate of the circuit breaker in the storage-destination instance (S8). Thereafter, the collection thread returns to the first inter-instance relationship and restarts the process (S1 and the following processes).

When the data of the inter-instance relationship management is updated during the process, the processing of the collection thread is performed according to the updated data.

According to the dynamic facility management system of the present invention configured as described above, the directory server 3 automatically generates instances based on the type of the measuring instrument and registers the inter-instance relationship related to the generated instances in the directory server 3, so that related software is automatically set in the system and the state monitoring can be quickly and easily started when various measuring instruments are attached to or removed from a target facility handled by the system, that is, the facility to be managed.

Further, according to the dynamic facility management system of the present invention, the data update module can update data by only notifying the data update module of names of a class and a method because all data of the inter-instance relationship are a character string, so that there is an advantage that even when a new measuring instrument is connected and a new class is introduced in the system, the data update module need not be modified and the system need not be stopped.

Although the embodiment described above is an example of a suitable form of the present invention, the present invention is not limited to this, but various modifications can be made without departing from the scope of the present invention. For example, in the above embodiment, a case has been described as an example in which the circuit breaker in the transformer substation, which is an electric power distribution facility, is defined as the target facility handled by the system, that is to say, the facility to be managed, the current passing through the circuit breaker and the palette switch operation signal are measured by a sensor, which is the measuring instrument, and the breaking current and the number of operation times of the palette switch are managed. However, the target facility handled by the system and the type of the measuring instrument are not limited to those described in the above embodiment. For example, a gas insulated switchgear may be the target facility handled by the system, and for example, an ammeter, a voltmeter, a gas pressure gauge, an oil pressure gauge, and a thermometer may be the measuring instrument. Further, the target facility handled by the system need not be an electric power distribution facility. In the above embodiment, an electric power distribution facility is used as the target facility handled by the system, so that an object class of IEC 61850 is used. However, when the present invention is applied to other than electric power distribution facility, for example, an originally defined object class is used.

Further, in the above embodiment, the directory server 3 and the maintenance server 9 are represented as separate bodies as a device configuration. However, the directory server and the maintenance server may be an integrated body as a device configuration. Specifically, for example, the directory server and the maintenance server may be formed by one PC.

REFERENCE SIGNS LIST

1A Facility to be managed/Circuit breaker in the embodiment
2A Measuring instrument/Sensor in the embodiment
3 Second device/Directory server in the embodiment
3b Directory
5A Measuring-instrument reading device
7 First device/Data management device in the embodiment
8 Communication network

The invention claimed is:
1. A dynamic facility management system comprising:
a measuring instrument that acquires information of a target facility handled by said dynamic facility management system;
a lower level device that performs input/output of signals from/to the measuring instrument directly or through a communication network;
a higher level device that performs input/output of signals from/to the lower level device directly or through a communication network; and
a server that performs input/output of signals from/to the lower level device and the higher level device,
wherein the dynamic facility management system stores: class information for each class including a class name comprising an item of information of the target facility handled by said dynamic facility management system acquired by the measuring instrument and a name of an instance generated corresponding to the class name; instance information for each instance including a name of the instance; an arranged location of the instance, and the class name; an inter-class relationship including a class name corresponding to higher level facility management data, a class name corresponding to lower level facility management data used to generate the higher level facility management data, how to use the lower level facility management data used to generate the higher level facility management data, and a name of a relation instance generated corresponding to a combination of a class corresponding to the higher level facility management data and a class corresponding to the lower level facility management data; and an inter-instance relationship for each relation instance including a name of the instance arranged in the higher level device and a name of the instance arranged in the lower level device in the server,
when the measuring instrument is connected to the lower level device or the communication network that performs input/output of signals from/to the lower level device, a) the lower level device transmits a type of the measuring instrument and a purpose of connecting the measuring instrument which is an item of information of the target facility handled by said dynamic facility management system to the server; b) the server generates an instance by referring to the class information on a basis of the type of the measuring instrument and the purpose of connecting the measuring instrument which is an item of information of the target facility handled by said dynamic facility management system; c) the server searches the instance information and if the generated instance is not present, the server registers the generated instance and generates and registers a relation instance by referring to the inter-class relationship; d) the server transmits the generated instance to the lower level device and the higher level device on a basis of the inter-instance relationship; and e) the server exchanges the higher level facility management data and the lower level facility management data between the instances on the basis of the inter-instance relationship.

2. The dynamic facility management system according to claim 1, wherein
when the measuring instrument is removed from the lower level device or the communication network that performs input/output of signals from/to the lower level device, a) the lower level device transmits a name of the generated instance corresponding to the removed measuring instrument to the server; b) the server updates the instance information so as to change a state of a predetermined instance to a state in which the higher level facility management data and/or the lower level facility management data is/are not processed and instructs the lower level device to delete an instance corresponding to the removed measuring instrument; c) the lower level device deletes the instance corresponding to the removed measuring instrument; and d) the higher level device and the server change a state of the instance corresponding to the removed measuring instrument to a state in which the higher level facility management data and/or the lower level facility management data is/are not processed on the basis of the instance information.

3. The dynamic facility management system according to claim 1, wherein all data of the relation instance are character strings.

4. The dynamic facility management system according to claim 1, wherein the target facility handled by said dynamic facility management system is a circuit breaker in a transformer substation and the measuring device is a sensor that acquires a current passing through the circuit breaker and a palette switch operation signal as the information.

* * * * *

UNITED STATES PATENT AND TRADEMARK OFFICE
CERTIFICATE OF CORRECTION

Page 1 of 1

PATENT NO. : 9,733,639 B2
APPLICATION NO. : 14/232522
DATED : August 15, 2017
INVENTOR(S) : Tetsuo Otani et al.

It is certified that error appears in the above-identified patent and that said Letters Patent is hereby corrected as shown below:

On the Title Page

Column 2, OTHER PUBLICATIONS, delete "Yukuwari" and insert -- Yakuwari --

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*